US006725184B1

(12) United States Patent
Gadh et al.

(10) Patent No.: US 6,725,184 B1
(45) Date of Patent: Apr. 20, 2004

(54) ASSEMBLY AND DISASSEMBLY SEQUENCES OF COMPONENTS IN COMPUTERIZED MULTICOMPONENT ASSEMBLY MODELS

(75) Inventors: Rajit Gadh, Madison, WI (US); Hari Srinivasan, Farmington Hills, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 339 days.

(21) Appl. No.: 09/602,119

(22) Filed: Jun. 23, 2000

Related U.S. Application Data

(60) Provisional application No. 60/141,633, filed on Jun. 30, 1999, and provisional application No. 60/143,391, filed on Jul. 12, 1999.

(51) Int. Cl.[7] .................................................. G06F 19/00
(52) U.S. Cl. ..................... 703/2; 703/6; 703/7; 703/21; 703/22; 700/95; 700/97
(58) Field of Search ................................. 703/21, 22, 2, 703/7; 700/95, 97

(56) References Cited

U.S. PATENT DOCUMENTS

| | | | | |
|---|---|---|---|---|
| 5,523,960 | A | * | 6/1996 | Jeong ............................. 703/6 |
| 5,907,488 | A | * | 5/1999 | Arimoto et al. ............... 700/97 |
| 5,980,084 | A | * | 11/1999 | Jones et al. .................... 700/95 |
| 6,223,092 | B1 | * | 4/2001 | Miyakawa et al. ......... 700/103 |
| 6,434,438 | B1 | * | 8/2002 | Jin et al. ....................... 700/95 |

FOREIGN PATENT DOCUMENTS

WO   WO 01/67372 A1 * 9/2001 ............ G06G/7/48

OTHER PUBLICATIONS

"Incremental algorithms for collision detection between solid models" M. Ponamgi, Solid Modeling 95, ACM 0–89791–672–7/95/0005, 1995.*
"Assembly Sequencing with Tolerated Parts", J. Latombe, Solid Modeling 95, ACM 0–89791–672–7/95/0005, 1995.*
"Algebraic Geometry and Group Theory in Geometric Constrain Satisfaction", O. Ruiz, ISAAC 94, ACM 0–89791–638–7/94/0007 1994.*
"A General Framework for Assembly Planning: The Motion Space Approach", D. Halperin, SCG 98, ACM 0–89791–973–4/98/6, 1998.*

(List continued on next page.)

*Primary Examiner*—Kevin J. Teska
*Assistant Examiner*—Fred Ferris
(74) *Attorney, Agent, or Firm*—Craig A. Fieschko, Esq.; DeWitt Ross & Stevens S.C.

(57) ABSTRACT

The ability to perform Assembly/Disassembly analysis of one or more components of the geometric model (e.g., a CAD model) of a multi-component assembly is helpful for design, construction and tear-down, maintenance (in-place and replacement), and reuse/recycling of the assembly. To facilitate assembly and disassembly analysis of geometric models, methods have been developed which allow generating, editing, validating and animating/digitizing assembly/disassembly sequences and directions for 3D geometric models, e.g., CAD models. These methods allow assembly/disassembly analysis to be performed based on non-contact geometric reasoning (i.e., spatial reasoning rather than contact reasoning) to determine an optimal non-interfering sequence (a valid sequence) to disassemble/assemble the modeled components. The methods are readily implemented in computers and similar electronic processing units to allow automated assembly/disassembly analysis, as exemplified by a software system called Assembly Disassembly in Three Dimensions (A3D). The A3D system maintains a hierarchical assembly structure for the geometric model and allows the user to add constraints to possible assembly/disassembly sequences, edit the overall shape of a modeled component, compute the resultant sequence of component removals/additions and their paths, and visualize assembly/disassembly by displaying the assembled and disassembled model and animating its assembly/disassembly steps.

8 Claims, 26 Drawing Sheets

Global Selective Disassembly method: Illustration for A in Figure 4a, $C^S = \{C_3\}$

OTHER PUBLICATIONS

"New Concepts for Complete Product Assembly Modeling" J. Gui, ACM Solid Modeling 93, ACM 0-89791-584-4/93/0005/0397 1993.*

Agarwal et al., 1996, "Efficient generation of κ–directional assembly sequences," Proceedings of the ACM–SIAM Symposium on Discrete Algorithms, pp. 122–131.

Ames et al., 1995, "Lessons learned from a second generation assembly planning system," Proceedings of the IEEE Int. Symposium on Assembly and Task Planning, pp. 41–47.

Arkin et al., 1989, "On Monotone paths among obstacles, with Applications to Planning Assemblies," Proceedings of the ACM Symposium on Computational Geometry, pp. 334–343.

Baldwin et al., 1991, "An Integrated computer aid for generating and evaluating assembly sequences for mechanical products," IEEE Trans. On Robotics and Automation, vol. 7, No. 1, pp. 78–94.

Beasley et al., 1993, "Disassembly sequences for objects built from unit cubes," Journal of Computer Aided Design, vol. 25, No. 12, pp. 751–761.

De–Fazio et al., 1987, "Simplified generation of all mechanical assembly sequences," IEEE Trans. On Robotics and Automation, vol. 3, No. 6, pp. 640–658.

Halperin et al., 1998, "A General framework for assembly planning–the motion space approach," Proceedings of the ACM Computational Geometry, pp. 9–18.

Henrioud et al., 1991, "LEGA: A Computer–aided generator of assembly plans," In L.S. Homem–de–Mello and S. Lee, editors, Computer–Aided Mechanical Assembly Planning, pp. 191–215. Kluwer.

Homem De Mello et al., 1991, "A correct and complete algorithm for the generation of mechanical assembly sequences," IEEE Trans. On Robotics and Automation, vol. 7, No. 2, pp. 228–240.

Huang et al., 1991, "A Framework of knowledge–based assembly planning," Proceedings of the Int. Conference on Robotics and Automation, pp. 599–604.

Jones et al., 1997, "Constraint–based interactive assembly planning," Proceedings of the Int. Conference on Robotics and Automation, pp. 913–920.

Kaufmann et al., 1996, "The Archimedes 2 mechanical assembly planning system," Proceedings of the Int. Conference on Robotics and Automation, Apr. 22–28, Minneapolis, pp. 3361–3368.

Ko et al., K., 1987, "Automatic assembling procedure generation from mating conditions," Journal of Computer Aided Design, vol. 19, No. 1, pp. 3–10.

Latombe et al., 1997, "Assembly sequencing with toleranced parts," Journal of Computer Aided Design, vol. 29, No. 2, pp. 159–174.

Lee et al., 1990, "Assembly planning based on geometric reasoning," Computation and Graphics, vol. 14, No. 2, pp. 237–250.

Romney et al., 1995, "An efficient system for geometric assembly sequence generation and evaluation," Proceedings of the ASME Design Engineering Technical Conference, Jul. 23–27, Hawaii, pp. 699–712.

Schweikard et al., 1995, "Assembly sequences for polyhedra," Algorithmica, vol. 30, No. 6, pp. 539–552.

Shyamsundar et al., 1997, "Geometric abstractions to support disassembly analysis," IIE Transactions on Design and Manufacturing, Accepted Sep. 1997 (1999) 31, 935–946.

Srinivasan et al., 1997, "Efficient geometric disassembly of multiple components from an assembly using wave propagation," Submitted for publication in the ASME Journal of Mechanical Design, Jul. 1997; Journal of Mechanical Design (Jun. 2000), vol. 122, pp. 179–184.

Srinivasan et al., 1998, "A Geometric algorithm for single selective disassembly using the wave propagation abstraction," Journal of Computer Aided Design, vol. 30, No. 8, pp. 603–613.

Srinivasan et al., 1999, "Selective disassembly for virtual prototyping as applied to de–manufacturing," Journal of Robotics and Computer Integrated Manufacturing, vol. 15, No. 3, pp. 231–245.

Srinivasan et al., 1999, "Selective Disassembly: Representation and Comparative Analysis of Wave Propagation Abstractions in Sequence Planning," Accepted for publication in the proceedings of the IEEE International Symposium on Assembly and Task Planning, Jul. 21–24, Porto, Portugal, Paper No. ATP/USA/17.

Swaminathan et al., 1996, "An Experience–based assembly sequence planner for mechanical assemblies," IEEE Trans. Of Robotics and Automation, vol. 12, No. 2, pp. 252–267.

* cited by examiner

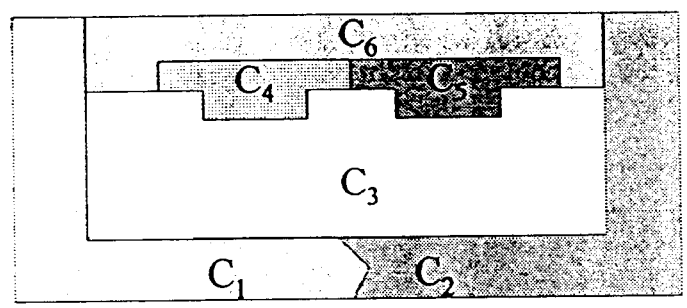
Figure 1. Test Assembly to illustrate Selective Disassembly

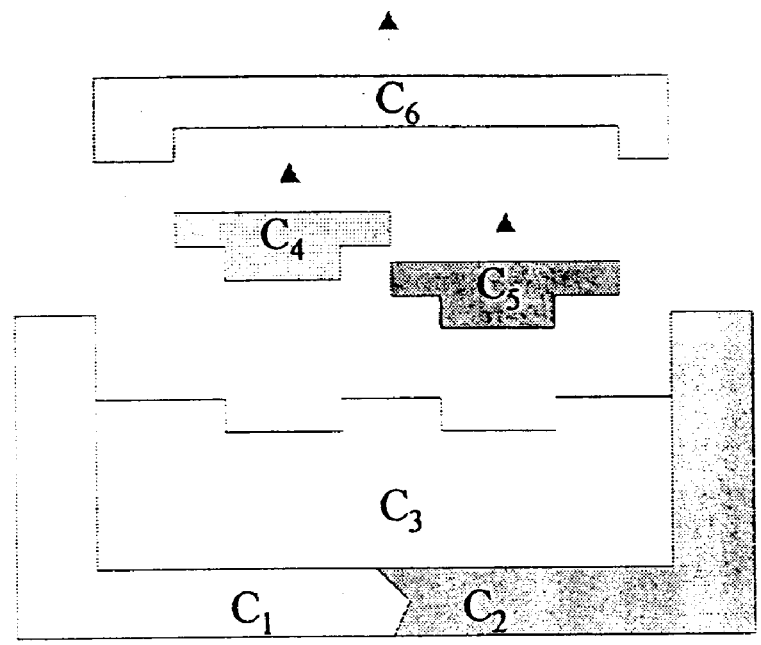
Figure 2. $S = [C_6, C_4, C_5]$ for $C^S = \{C_4, C_5\}$

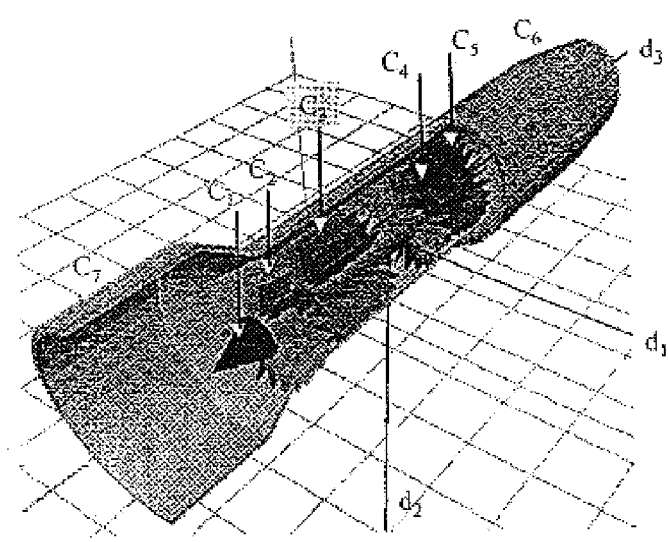
Figure 3. Test assembly to illustrate Selective Disassembly by analyzing Spatial Constraints

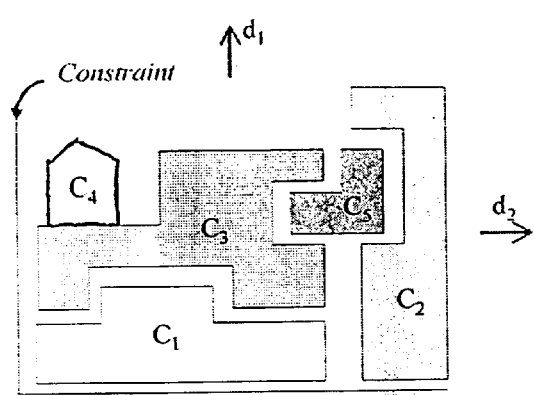 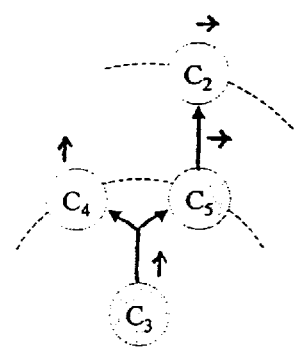
Figure 4a. Test Assembly　　　Figure 4b. RG showing disassembly ordering GSD_Algorithm($C^S$)
{
   1. Determine the spatial constraints for every $C_i \in A$ along every $d_i \in DD$.
   2. Determine the spatial boundary sets for A.
   3. Determine the spatial adjacent set for every $C_i \in C$.
   4. Construct the RG for $C^S$.
   5. Compute disassembly sequence and paths by topologically sorting RG.
}

Figure 4c. Global Selective Disassembly Algorithm

| SPATIAL CONSTRAINTS | | |
|---|---|---|
| Component | Direction | Spatial Constraints |
| $C_1$ | $d_1$ | $\{C_3, C_4, C_5\}$ |
| | $d_2$ | $\{C_2, C_3\}$ |
| $C_2$ | $d_1$ | $\{C_5\}$ |
| | $d_2$ | $\{\}$ |
| $C_3$ | $d_1$ | $\{C_4, C_5\}$ |
| | $d_2$ | $\{C_1, C_2, C_5\}$ |
| $C_4$ | $d_1$ | $\{\}$ |
| | $d_2$ | $\{C_2, C_3, C_5\}$ |
| $C_5$ | $d_1$ | $\{C_2, C_3\}$ |
| | $d_2$ | $\{C_2\}$ |

1

| SPATIAL BOUNDARY SET |
|---|
| $B_1 = \{C_2, C_4\}$ |
| $B_2 = \{C_5\}$ |
| $B_3 = \{C_3\}$ |
| $B_4 = \{C_1\}$ |

2

| SPATIAL ADJACENT SET |
|---|
| $SA_1 = \{C_2, C_3, C_4, C_5\}$ |
| $SA_2 = \{\}$ |
| $SA_3 = \{C_2, C_4, C_5\}$ |
| $SA_4 = \{\}$ |
| $SA_5 = \{C_2, C_4\}$ |

3

| REMOVAL INFLUENCE ACYCLIC GRAPH (RG) | |
|---|---|
| $C_3$: | $\{C_4, C_5\} \subset SA_3$ |
| | $RI_3^{4,5}$ = TRUE (along $d_1$) |
| | $\{C_1, C_2, C_5\} \not\subset SA_3$ |
| $C_4$: | $A_4$ = TRUE (along $d_1$) |
| $C_5$: | $\{C_2, C_3\} \not\subset SA_5$ |
| | $\{C_2\} \subset SA_5$ |
| | $RI_5^2$ = TRUE (along $d_2$) |
| $C_2$: | $A_2$ = TRUE (along $d_2$) |

4

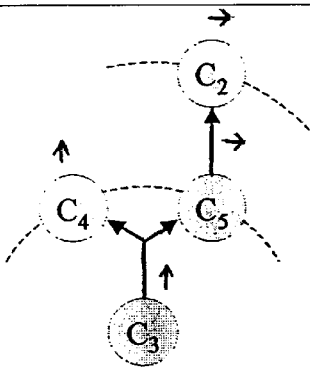

TOPOLOGICAL SORTING

From RG

OS = [ $C_2$,
$C_4$,
$C_5$,
$C_3$ ]

Paths = [ →,
↑,
→,
↑ ]

5

Figure 4d. Global Selective Disassembly method: Illustration for A in Figure 4a, $C^S = \{C_3\}$

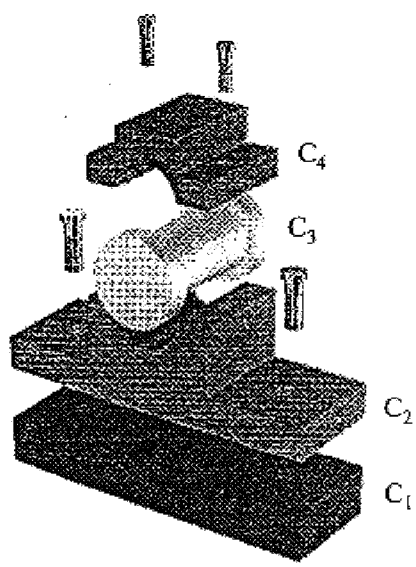
Figure 5. Test assembly (exploded view shown) to describe the selective disassembly attributes

Figure 8. IE and Selective Disassembly Sequence

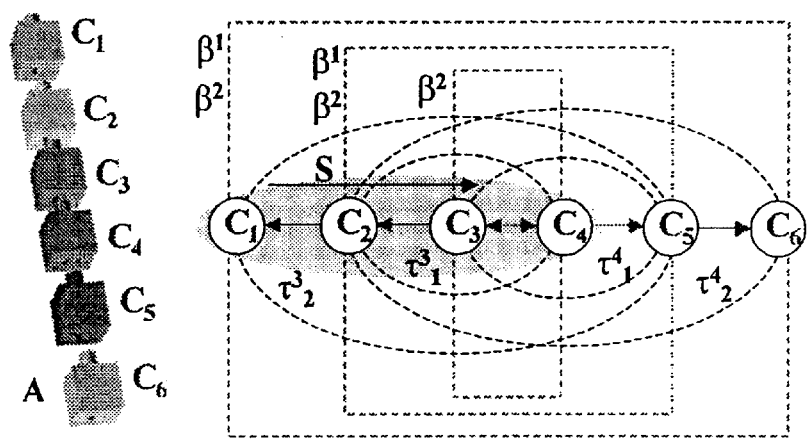
FIG. 11a. A: Test assembly (exploded view) and the RG at $T = 2$ for $C^S = \{C_3, C_4\}$

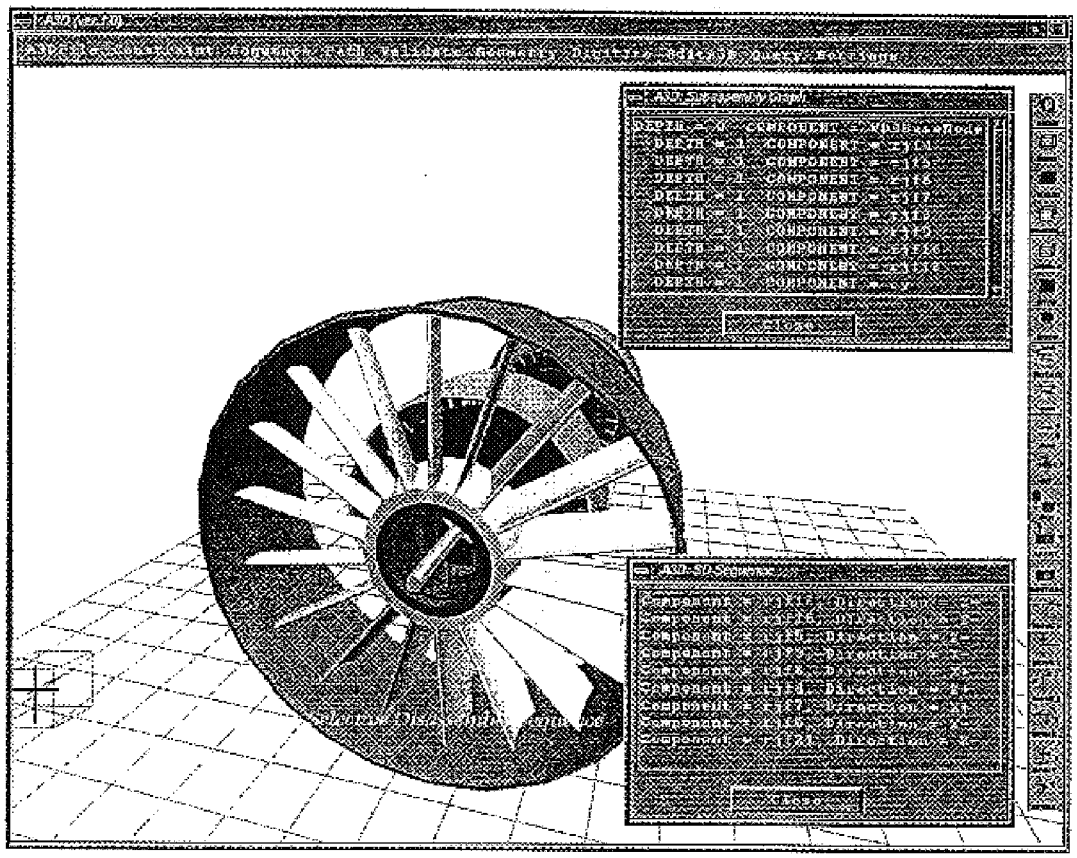
Figure 12. A3D (Assembly Disassembly in Three Dimensions): Snapshot of the system

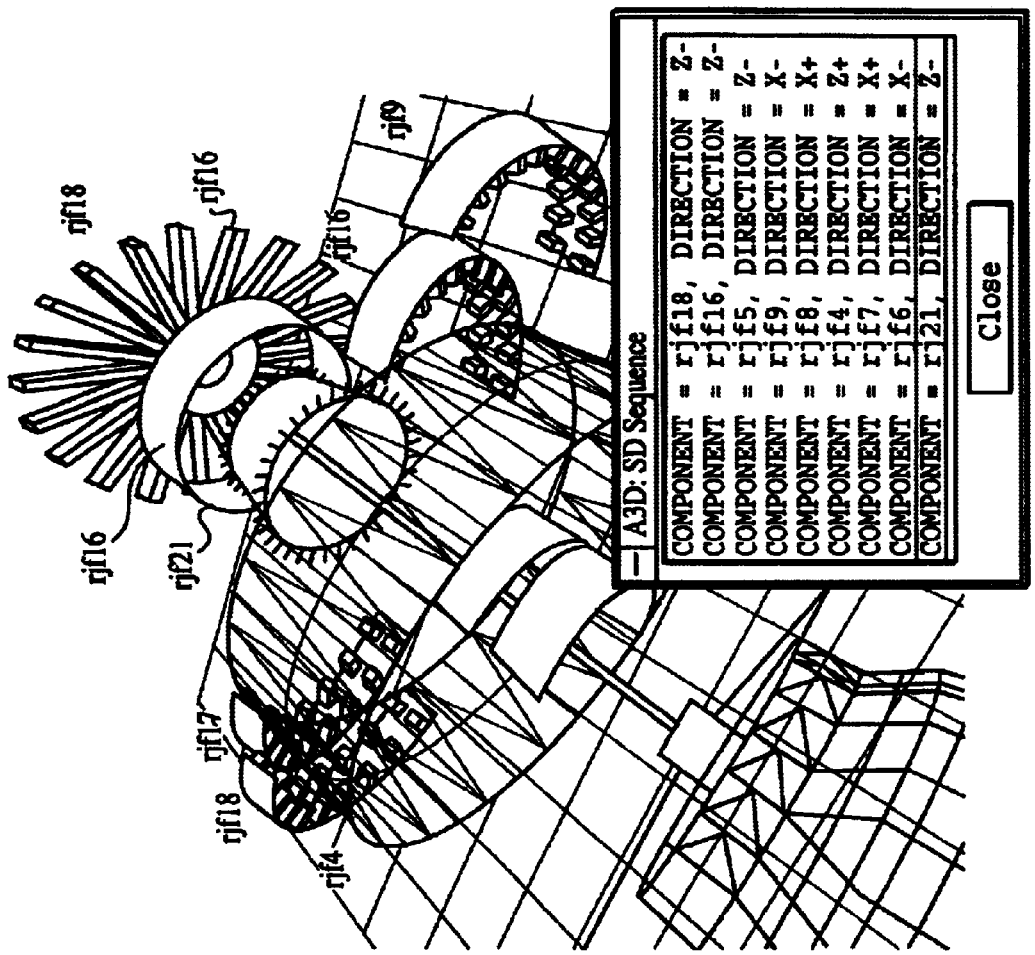
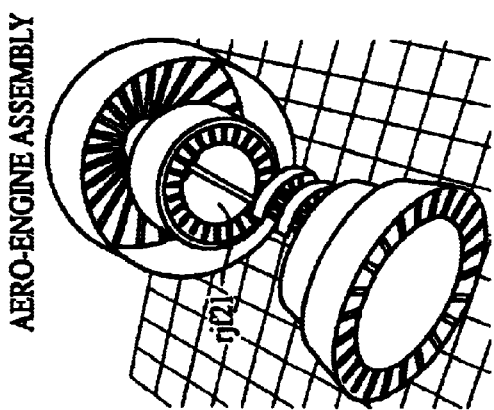
FIG. 15

CAB SUBASSEMBLY

ASSEMBLY AND DISASSEMBLY SEQUENCES OF COMPONENTS IN COMPUTERIZED MULTICOMPONENT ASSEMBLY MODELS

CROSS-REFERENCE TO RELATED APPLICATIONS

This application claims priority under 35 USC §119(e) to U.S. Provisional Patent Application No. 60/141,633 filed Jun. 30, 1999 and U.S. Provisional Patent Application No. 60/143,391 filed Jul. 12, 1999, the entireties of which are incorporated by reference herein.

STATEMENT REGARDING FEDERALLY SPONSORED RESEARCH

This invention was made with United States government support awarded by the following agencies:

National Science Foundation Grant No. 9622665
The United States has certain rights in this invention.

FIELD OF THE INVENTION

This invention relates generally to the field of automated analysis of CAD models, and more particularly, to the field of determining assembly and disassembly sequences for components within multi-component CAD models of assembled parts (i.e., multi-component assemblies).

BACKGROUND OF THE INVENTION

Selective Disassembly involves disassembling a selected set of components ($C^S$) from a multi-component assembly (A) to obtain a selective disassembly sequence (S). For example, to disassemble $C^S=\{C_4, C_5\}$ from A in FIG. 1, $S=[C_6, C_4, C_5]$, as shown in FIG. 2. (Note that roster brackets { } are used to denote a non-ordered set wherein the order of its members is unimportant, whereas square brackets [ ] are used to denote an ordered set wherein the order of its members is as listed.) It should be understood that selective assembly, the "converse" of selective disassembly, is necessarily included within the selective disassembly analysis. However, the term "selective disassembly" will generally be used to describe both selective disassembly of components as well as their selective assembly. A selective disassembly sequence S satisfying a user objective such as minimal component removals, minimum disassembly time, or minimum cost is defined as an optimal sequence (OS).

Applications for selective disassembly include assembling, maintenance and recycling operations. For example, aircraft engine maintenance requires the selective disassembly of the engine—which may involve prior disassembly/removal of some parts before the engine itself may be disassembled—and it does not require the disassembly of the entire aircraft. As might be imagined, effective use of some apparata requires their rapid and efficient disassembly and assembly; for instance, if an aircraft engine cannot be rapidly disassembled and reassembled for maintenance and/or repair, the aircraft may need to be taken out of service for an extended period of time, and the effective upkeep cost of the aircraft can be greatly increased. Another concern is recycling, wherein components of one apparatus are reused in another apparatus. From the standpoint of conservation of natural resources, it is generally desirable to reuse components rather than construct new ones. However, if components to be recycled/reused cannot be quickly and efficiently disassembled from the original apparatus and installed in the new apparatus, the cost of recycling may be such that it is not worthwhile. Therefore, selective disassembly analysis of components in an assembly A, and the determination of optimal disassembly sequences OS, is an important area of research in assembly/disassembly planning.

One potential approach to determining optimal disassembly sequences OS is an exhaustive enumeration of all the possible selective disassembly sequences S for the assembly A (i.e., perform a complete disassembly analysis), and the selection of optimal sequences OS with minimal removals. However, this analysis is computationally expensive (typically exponential) and is not recommended.

Several researchers (e.g., Ashai, 1995; Beasley and Martin, 1993; Romney et al., 1995) have proposed automated complete disassembly methods, which involve disassembling all the components in assembly A. Although a selective disassembly sequence S can be obtained from a complete disassembly analysis as previously noted (i.e., by selecting optimal sequence OS from all of the selective disassembly sequences S), the complete disassembly analysis does not automatically give an optimal solution OS. For example, a selective disassembly sequence S can be obtained for a selected component set $C^S$ by recursively disassembling components that are disassemblable in assembly A until all the components in $C^S$ are disassembled. To illustrate this, consider A in FIG. 1 with selected component set $C^S=\{C_4, C_5\}$. Let s=number of components in a sequence. Following the complete disassembly algorithm, the selective disassembly sequence S to disassemble the selected component set $C^S$ is $[C_1, C_2, C_6, C_3, C_4, C_5]$ with s=6, but the optimal disassembly sequence $OS=[C_6, C_4, C_5]$ with s=3. Hence, a separate approach for selective disassembly is preferred. Nevertheless, while complete disassembly algorithms are largely inappropriate for selective disassembly analysis, it is illustrative to survey the prior work in complete disassembly analysis. Therefore, a brief overview is now provided.

Baldwin et al. (1991); De-Fazio and Whitney (1987); Henrioud and Boudjault (1991) propose an *Assembly Sequence Diagram* to represent the ability or inability to assemble a component with other components. The user is asked a number of questions regarding the precedence relation of components in order to enumerate all assembly sequences. However, the number of such questions grow exponential to the number of components in A, and therefore the computational expense of this method limits it to smaller assemblies. Further, the method is not automated insofar as users need to answer the inquiries relating to the components, and therefore the time expense of the method is further increased.

Homem de Mello and Sanderson (1991) propose an AND/OR Graph that establishes assembly conditions and precedence relationships between components. The AND/OR graph represents the sequences for assembly based on local motion analysis in three dimensions. A cut-set of the mating diagram of the assembly and subassemblies is used as a basis for disassembly questions. The AND/OR Graph method suffers from the same disadvantages as the Assembly Sequence Diagram method in that it is time-consuming to execute except for assemblies with only a small number of components.

To reduce the number of queries to the user, several authors (Lee and Shin, 1991; Huang and Lee, 1991; Swaminathan and Barber, 1996) propose *Knowledge-Assisted Systems* that use preexisting information (stored from earlier queries to the user) to analyze similar products. In effect, these are essentially expert systems. The part interconnections and the directional constraints of the motion that bring two parts together are analyzed based on both existing knowledge and further user queries. These methods do not significantly decrease analysis time, particularly insofar as the information stored by the expert system can only be re-used in later products of the same type.

Several researchers have utilized computational geometry techniques for assembly analysis. Arkin et al (1989) use the concept of a monotone path between obstacles to deduce a removable subassembly and a single extended translation to remove it. Shyamsundar and Gadh (1997) propose the use of a convex hull based representation of assemblies for geometric reasoning. Beasley and Martin (1993) consider the generation of disassembly motion for voxelized models of objects based on disassemblability analysis. Mattikalli and Khosla (1992) propose constraint-based (i.e., contact geometry-based) analysis to determine the translational and rotational disassemblability of components for 3D assemblies. Ashai (1995) proposes metric-based evaluation of complete disassembly sequences via disassemblability analysis of 3D assemblies. However, these proposed techniques are primarily based on analysis of contact geometry of components, and they therefore suffer from the disadvantages of contact geometry reasoning discussed later in this document (most particularly, failure to detect interference of components during linear global assembly/disassembly motions). Further, they assume sequential disassembly of components (removal of components one at a time) for generating complete disassembly and assembly sequences. These will therefore not allow determination of optimal sequences OS wherein simultaneous removals allows for more efficient disassembly. In addition, where complete disassembly results are obtained, these results must be further analyzed to ascertain the presence of optimal sequences OS.

Several researchers (Romney et al., 1995; Jones et al., 1997; Latombe et al., 1997) use a *Non-Directional Blocking Graph* that describes part interactions from the blocking nature of components, by utilizing the concept of graph partitioning. Each partition is a removable subassembly, and the partitioning process is used to determine a complete disassembly sequence. Some of these approaches advantageously do not use strictly contact-geometry approaches, and therefore can lead to improved analysis results. However, a study on efficient partitioning of an assembly into sub-assemblies show that the problem is NP-Hard and therefore very expensive computationally, in some cases to the extent that partitioning is unusable as a practical matter. Therefore, successive study (Schweikard and Wilson, 1995; Agarwal et al., 1996) on assembly partitioning for complete disassembly sequence generation focuses on algorithms for feasible partitioning with an objective of minimal disassembly motions. In a later study, Halperin et al. (1998) extend non-directional blocking graph partitioning to complete disassembly with multiple translations. However, while the non-directional blocking graph methods represent an advance in complete disassembly analysis, they still suffer from several of the disadvantages of prior approaches, e.g., failure to consider simultaneous component removals, impaired results where contact geometry approaches are used, and high computational expense.

While some of the foregoing methods have been presented as theoretical approaches and are not known to be successfully implemented, others of the methods have resulted in the generation of several assembly/disassembly tools. Stanford Assembly Automation Tool, STAAT, (Romney, 1995) uses non-directional blocking graph partitioning for contact-based and extended translation analysis of components. The Archimedes tool (Kaufmann et al., 1996) determines assembly sequences based on complete disassembly analysis and uses non-directional blocking graph partitioning as the basic structure. A set of complete disassembly sequences are generated based on extended contact-geometry analysis (Ames et al., 1995). Archimedes includes the useful feature of allowing the user to specify desired constraints on disassembly, e.g., prohibiting component removals in certain directions owing to "extrinsic" workspace restrictions. The user-specified constraints, while not directly considered in the disassembly analysis, are modeled as a filter so as to generate a feasible assembly plan from the generated set of complete disassembly sequences (Jones et al., 1997). It is also helpful that the newer "second-generation" tools (e.g. the Archimedes tool) perform geometric reasoning for automated disassembly sequencing with little user inputs, which makes them easier to use than the earlier tools (e.g. the LEGA tool of Henrioud and Boutjault, 1991) wherein assembly and disassembly analysis is performed via extensive user inputs, and wherein geometric reasoning is not used.

In view of the prior research, there is still a need for an efficient way of determining selective disassembly sequences S rather than complete disassembly sequences, and more particularly optimum selective disassembly sequences OS. Preferably, any methods and apparata for determining such sequences should be computationally efficient; should allow analysis of assemblies in up to three dimensions using input geometric models rather than a continuous stream of user inputs; and should be highly automated in all other respects as well. Further, any such methods and apparata should allow determination of selective disassembly sequences S which take into account not just the spatial constraints of the components (i.e., the assembly/disassembly constraints due to the spatial position and geometry of all other components in the assembly), but also user-defined constraints, e.g., the user's desire to determine selective disassembly sequences which have maximum component removals in certain directions. Further, they should avoid the disadvantages of contact geometry-based reasoning (e.g., failure to detect component interference) so that determined selective disassembly sequences S will in fact be valid and effective.

SUMMARY OF THE INVENTION

The invention involves methods for automated selective disassembly by analyzing a geometric model of a multi-component assembly A to determine an optimal disassembly sequence OS in a computationally efficient manner. In general, efficiency and optimality are related and one is usually achieved at the cost of the other. For example, if efficiency is the only issue, then any of the previously noted complete disassembly solutions can be extended for selective disassembly; however, this results in a non-optimum solution, as discussed above. On the other hand, if optimality is the only issue, then exhaustive enumeration will give an optimum solution; however, this approach is computationally inefficient, as discussed above. Therefore, the methods discussed in this document balance the requirements of computational efficiency and optimal solution, i.e., they address the automatic determination of a selective disassembly sequence S with fewer removals, and which can be computed in a feasible computation time.

Preferred embodiments of the invention determine the selective disassemblability S of the components by analyzing the spatial constraints imposed on the components rather than the contact geometry of the components, and therefore provide for global disassemblability (as will be described in greater depth elsewhere in this document). Further, preferred embodiments also incorporate user-defined geometric constraints into the selective disassembly analysis, i.e., they allow consideration of such factors as desired component grouping and desired assembly/disassembly directions for specified components within the assembly. The spatial constraints of the assembly geometry and the user-defined constraints are used to evaluate the accessibility of components, which is followed by determining the disassembly ordering of the components to define optimal disassembly sequences OS. Further, the methods may be easily extended from selective disassembly analysis to complete disassembly analysis by simply expanding them to consider all components within the assembly A, rather than only selected components $C^S$ (i.e., a user may specify all components in A as being the "target" components $C^S$). The methods are highly automated insofar as they only require the definition of the geometric model of the assembly A as their starting point, and they do not require extensive user inquiries and human reasoning steps in order to obtain disassembly sequences S.

So that the reader may better grasp the structure and performance of the invention, a brief description of particularly preferred versions of the invention will now be provided. In one preferred version, assembly/disassembly sequences for components within multi-component assemblies are determined in the following manner. First, the spatial boundary component sets $\beta$ within the assembly are determined. The spatial boundary sets $\beta$ are ordered from a outermost spatial boundary set $\beta_1$ to an innermost spatial boundary set $\beta_n$, and each set $\beta_x$ includes the components within the assembly which are removable from the assembly without collision against one or more other components after any prior spatial boundary sets $\beta_y$ (y<x) are removed from the assembly. Second, the spatial removal influence on each component by selected other components—i.e., the "removability" of each component with respect to the selected components—is determined. Within each spatial boundary set $\beta_x$, the spatial removal influence $RI_i^{SS}$ on each component $C_i$ by subsets SS of one or more components within the combined spatial boundary sets $\beta_y$ (y<x) is determined (these combined spatial boundary sets being referred to herein as the spatial adjacent set $SA_i$). This spatial removal influence $RI_i^{SS}$ may be regarded as true/positive if component $C_i$ is removable when SS is removed from the assembly, and false/negative if the removability of $C_i$ is unaffected by the removal of SS. Once the spatial removal influences $RI_i^{SS}$ are determined, one essentially has a "map" of the assembly ordering of the components within the assembly, with each component's dependence on other components for removability being defined. (Later in this document, a graphical depiction of the spatial removal influences $RI_i^{SS}$ will be provided in the form of a Removal Influence Graph.) One may therefore use the spatial removal influences $RI_i^{SS}$ to determine disassembly sequences: for some target component $C_i$ within the assembly, one may look to the spatial removal influences $RI_i^{SS}$ to determine the component(s) SS that must be removed before $C_i$ can be removed; can look to the spatial removal influence for SS to determine the component(s) that must be removed for SS to be removed; and so on.

As an example, one may generate a disassembly sequence for each outer component in the assembly (those components upon which no positive spatial removal influence is exerted by another component, i.e., the components at the boundary/surface of the assembly). Starting at the outer components, one may identify the one or more components on which the outer component has positive spatial removal influence. These can then each be recharacterized as outer components, and again one may identify the one or more components on which the outer component has positive spatial removal influence. This process can be repeated, with the identities of the outer components being stored in priority order. In effect, this approach works inwardly from the boundary/surface of the assembly to its "core" to define disassembly sequences. From the determined disassembly sequence(s), an optimal disassembly sequence might then be defined as the disassembly sequence having minimum components in the sequence (i.e., minimum component removals).

As another example, one may instead generate disassembly sequences for some "target" component(s) within the assembly by starting at the target component(s) within the assembly, and then using spatial removal influence information to work outwardly towards the surface/boundary of the assembly. Here, each target component can be defined as an inner component, and one may then identify all outer components (those components having positive spatial removal influence with respect to one or more of the inner components). This process can then be repeated with the identified outer components being redefined as inner components, and the identities of the inner components may be stored in priority order. Again, an optimal disassembly sequence might then be defined as the disassembly sequence having minimum components in the sequence (i.e., minimum component removals).

In the foregoing processes, user-defined constraints may be incorporated to tailor disassembly sequences to a user's liking. As an example, a user might want to restrain certain components to removal in a certain number of user-defined directions (such as specifying that the components of an automobile engine are to be assembled upwardly under the hood of a car, rather than downwardly beneath the car). This can be done by simply defining the spatial boundary sets $\beta_x$ to include the components that are removable in the specified direction(s) without collision against one or more other components after any prior spatial boundary sets $\beta_y$ (y<x) are removed from the assembly. This can also be done if the spatial removal influence for a selected component $C_i$ within the assembly is defined to be positive only if the component $C_i$ is removable along at least one of a number of user-defined paths when the components within its spatial adjacent set $SA_i$ are absent from the assembly. As another example, if a user wishes to determine a disassembly sequence for a number of target components, the target components can be grouped and analyzed as a single element within the assembly. The disassembly sequence for the grouped element will therefore define the disassembly sequence for all target components.

As is also discussed elsewhere in this document in the passages dealing with the Multiple Wave Propagation (MWP) and Priority Intersection Event (PIE) methods, the determination of disassembly sequences for specified target components may be hastened by identifying "intersection events"—those components which are necessary for defining one or more common disassembly sequences for all of the target components. The intersection events may be identified by determining the intersections between the spatial boundary sets $\beta$ and between target sets $\tau$ of components. The target sets $\tau$ are ordered from an innermost target set $\tau_0$ to an outermost target set $\tau_n$, wherein $\tau_x$ (0<x≤n) is the set of components such that for every component $C_j$ in $\tau_x$, there will be at least one component $C_i$ in $\tau_{x-1}$ such that $C_i$ is removable from the assembly without collision after $C_j$ is removed, provided the components within all $\tau_y$ (y≧x+1) are absent. After the intersection events are determined, one may use the spatial removal influences $RI_i^{SS}$ noted earlier to determine sequences from the intersection events to the outermost spatial boundary set $\beta_1$ (i.e., to the boundary/surface of the assembly), and in turn from the intersection events to the target components, to thereby determine sequences between the target components and the boundary/surface of the assembly.

The methods have been implemented and tested in a prototypical software system termed A3D (Assembly and Disassembly in Three Dimensions), which is also described in this paper. The A3D software allows automated analysis of assemblies at the product design stage itself, i.e., assembly analysis is performed on the virtual prototype (geometric CAD model) of the product. The A3D system generates, animates, edits, and validates the assembly/disassembly sequences and paths for product components and sub-assemblies based on spatial constraints, as opposed to contact geometry. A3D maintains a hierarchical assembly structure and allows the user to add constraints, edit the component shape, and compute the resultant sequence and paths for the edited design. In addition, the user can perform several other virtual manufacturing analyses such as interception checking, clearance checking, accessibility analysis of components, and design rule checking. The A3D system can be applied to all types of product assemblies, and applications include assembly, maintenance, recycling and visualization. Performing disassembly analysis on the CAD model of a product before production allows analysis for easy combination and separation of components, thereby reducing the assembly and disassembly cost/time both during initial manufacture of the product and in later product maintenance/recycling. Moreover, the ability to analyze and visualize (e.g., view and animate) disassembly better allows a designer to assess the design for assembly and disassembly concerns, and in turn optimize the design for a better product.

BRIEF DESCRIPTION OF THE DRAWINGS

FIG. 1 is a schematic view of an exemplary assembly A having components $C_1$, $C_2$, $C_3$, $C_4$, $C_5$, and $C_6$.

FIG. 2 is a schematic view of the assembly A of FIG. 1 having components $C_4$, $C_5$, and $C_6$ removed.

FIG. 3 is a perspective view of another exemplary assembly A.

FIG. 4a is a schematic view of another exemplary assembly A.

FIG. 4b is a removal influence graph for the assembly A of FIG. 4a, wherein $C^S=\{C_3\}$.

FIG. 4c illustrates a "pseudocode" representation of the GSD (Global Selective Disassembly) method.

FIG. 4d illustrates the steps involved in constructing a removal influence graph for the assembly A of FIG. 4a, wherein $C^S=\{C_3\}$.

FIG. 5 is a perspective view of another exemplary assembly A.

FIG. 11a illustrates an exploded view of assembly A and the removal influence graph at time T=2 for $C^S=\{C_3, C_4\}$.

FIG. 12 is a view of an exemplary A3D display obtained from a computer monitor.

FIG. 14b is an exemplary A3D display obtained from a computer monitor illustrating a disassembled view of the CAD model of FIG. 14a.

FIG. 15 is another view of an exemplary A3D display obtained from a computer monitor illustrating assembled and disassembled views of an aircraft engine subassembly, wherein $C^S=\{rjf21\}$.

DETAILED DESCRIPTION OF THE INVENTION

Figure 4E:
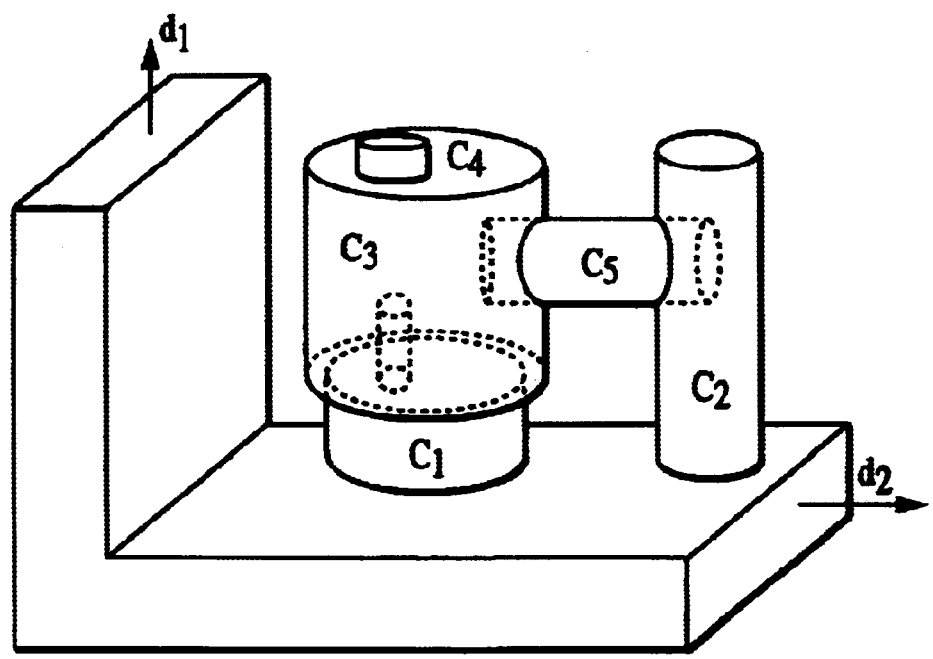
FIG. 4e is a perspective view of another exemplary assembly A.

The invention is addressed to the problem of automatically determining a selective assembly/disassembly sequence S to assemble or disassemble selected components $C^S$ from a constrained assembly A. The components that can be removed independently of each other are simultaneously disassembled. The objective is to use simultaneous removals in place of sequential removals wherever possible, and then minimize the number of simultaneous removals for selective disassembly of components. These objectives equate to the minimization of disassembly operations, and are a measure of the difficulty of disassembling. Therefore, a disassembly sequence S meeting these objectives is defined as an Optimal Sequence (OS).

The approach for determining the optimal sequence OS uses the following assumptions, which are standard in disassembly analysis:

1. Assemblies are assumed to be rigid (non-deformable), frictionless, and defined by their nominal geometry (no tolerances are considered).
2. Components are 1-disassemblable (they only require a single linear motion to be removed from assembly A).
3. Disassembly sequences are monotonic (components are totally removed while disassembling), and non-destructive, i.e., no component is destroyed.
4. An assembly sequence is a reverse of a disassembly sequence (components may be assembled by reversing their disassembly steps, and vice-versa).

It is also assumed that a component $C_i$ in three-dimensional space is free to move along any direction. However, a component in an assembly A is restricted to move only along some directions for selective disassembly due to the constraints on the component geometry. The geometric constraints considered in the invention are primarily of two types, spatial constraints and user-defined constraints.

Spatial Constraints are constraints imposed in assembling or disassembling of a component $C_i$ due to the spatial position and geometry of all other components in the assembly A. Spatial constraints on $C_i \in A$ refer not only to the constraints that result due to the mating components of $C_i$ but also due to the components that may collide with $C_i$ in different directions. It is noted that the invention, which utilizes a spatial approach to disassemblability rather than a contact geometry approach, does not suffer from the drawback of the contact-based approaches that interference may not be detected during linear global assembly/disassembly motions. To illustrate the drawbacks of a contact-based approach, consider assembly A shown in FIG. 3 with $C^S=\{C_3\}$. Let a direction vector be denoted as $d_1$. $C_3$ is in contact with $C_4$ (along the cylindrical surface). Performing an assembly/disassembly analysis based on contact geometry alone will result in a solution saying that $C_3$ is disassemblable along $d_3$ and $-d_3$. However, $C_3$ is disassemblable locally (infinitesimal translation is possible along $d_3$ and $-d_3$), not globally, i.e., $C_3$ is spatially constrained by $\{C_4, C_5\}$ along $d_3$ and by $\{C_1, C_2\}$ along $-d_3$. Therefore, a selective disassemblability analysis based on spatial constraints rather than contact geometry reasoning is desirable to ensure global assembly/disassembly of components.

User-Defined Constraints are constraints imposed by the user on the component geometry that restrict some assembly/disassembly operations. User-defined constraints include component grouping (two or more components are grouped as a subassembly) and directional constraints (one or more assembly or disassembly directions of components are constrained). For example, a user may desire to group a set of components based on the functionality of the subassembly. As another example, a user may wish to impose directional constraints to specify practical restrictions imposed in disassembling due to fixtures, the disassembly workspace, etc. To illustrate, when considering the disassemblability of an automotive engine mounted within a car chassis, a user will generally want to restrict analysis primarily to component removal directions allowing removability from the open hood of the car, rather than through its firewall, side panels, front grill, or from the bottom of the car.

It is noted that the ability of preferred embodiments of the invention to consider user-defined constraints significantly enhances the user-friendliness and practical benefit of the invention. As previously noted, many of the prior disassembly planning tools do not explicitly allow consideration of user-defined constraints. One potential approach to allow the prior tools to account for user-defined constraints is to enumerate all possible disassembly sequences and then apply the constraints to determine the acceptable sequences. However, this approach is time consuming—often exponential—and is not recommended.

The preferred methods used by the invention for selective disassembly of one or more components are defined in terms of the following attributes.

Spatial Disassemblability $\Delta_i$: the spatial disassemblability $\Delta_i$ is a binary value that indicates if component $C_i \in A$ is removable from assembly A. Let DD denote a set of disassembly directions and $d_i$ denotes a direction vector. The spatial disassemblability of component $C_i$, denoted as $\Delta_i$, is TRUE if there exists a direction $d_i \in DD$ along which component $C_i$ does not collide with any other $C_j \in A$ (where $j \neq i$). For example, in FIG. 4a, $\Delta_2$=TRUE for $C_2$ and $\Delta_5$=FALSE for $C_5$; as another example, in FIG. 5, $\Delta_4$=TRUE for $C_4$ and $\Delta_3$=FALSE for $C_3$. A spatially disassemblable component is denoted as $C_b$ (i.e., if $\Delta_i$=TRUE, $C_i$ may be denoted $C_b$).

Spatial Removal Influence $RI_i^j$: The spatial removal influence $RI_i^j$ is a binary value that indicates if component $C_i \in A$ is removable after the removal of component $C_j \in A$. For example, in FIG. 5, $RI_3^4$=TRUE, since $\Delta_3$ is TRUE with removal of $C_4$ in A. Similarly, $RI_2^4$=FALSE, since $\Delta_2$ is FALSE with removal of $C_4$ in A. Removal influence can also be expressed for multiple components, as will be discussed elsewhere in this paper. For example, in FIG. 4a, $RI_3^{4,5}$=TRUE along $d_1$.

Single- and Multiple-Dependent Components: A component $C_i$ requiring disassembly of one adjacent component for its removal in assembly A is defined as a single-dependent component (or a 1-dependent component). For example, in FIG. 5, component $C_3$ is single-dependent, i.e., removal of component $C_3$ is possible by disassembling component $C_4$. However, a component $C_i$ requiring disassembly of more than one component for its disassembly in assembly A is defined as a multiple-dependent component. For example, component $C_3$ in FIG. 4a is multiple-dependent, i.e., 2-dependent (requiring prior removal of $C_4$ and $C_5$). Moreover, a component $C_i$ requiring disassembly of none of its adjacent components is a boundary component ($C_i$ can be directly disassembled); in accordance with the foregoing terminology, this might be regarded as a "zero-dependent" component, though the term "boundary component" is preferred as being more illustrative.

For selective disassembly of some number $1 \leq s \leq n$ selected components from an assembly A having n components, three methods are proposed:

(1) The Global Selective Disassembly (GSD) method. This method is particularly preferred because it may be applied to any number of selected target components $1 \leq s \leq n$, and may be used with assemblies A having single and/or multiple dependent components. The method is thus termed "global" owing to its wide applicability.

(2) The Multiple Wave Propagation (MWP) method. This method is applicable for assemblies A with single-dependent components, and for computational efficiency, it is preferred for use with assemblies A having $s<<n$ (i.e., where the number of components s to be selectively disassembled are relatively few in relation to the overall number n of components in the assembly A).

(3) The Priority Intersection Event (PIE) method. This method is applicable for assemblies A with single-dependent components, and for computational efficiency, it is preferred for use with assemblies A having $s \rightarrow n$ (i.e., where the number of components s to be selectively disassembled approaches the overall number n of components in the assembly A).

It is notable that any of these selective disassembly methods may also be used for complete disassembly analysis by simply applying the methods and setting s=n.

The Global Selective Disassembly (GSD) Method

The Global Selective Disassembly (GSD) method for selective disassembly with spatial constraints makes use of the previously-noted attributes of disassemblability $\Delta_i$ and removal influence $RI_i^j$. Removal influence $RI_i^j$ is itself more efficiently determined by automated methods (e.g., by a computer) if it is defined in terms of further attributes, Spatial Boundary Sets $B_r$ and Spatial Adjacent Sets $SA_i$. Thus, the attributes utilized in the GSD method may be summarized as follows:

(1) Spatial Disassemblability $\Delta_i$: As defined previously, the spatial disassemblability $\Delta_i$ is a binary TRUE/FALSE value that indicates if component $C_i \in A$ is removable from A.

(2) Spatial Boundary Set $B_r$: As will be discussed below, spatial boundary sets are useful in determining spatial removal influence. The spatial boundary set, denoted as $B_r$, is defined as follows: For $r<1$ (r being an integer), $B_r = \{\ \}$ (the empty set). For r=1, $B_r$=set of spatially disassemblable components $C_b$ in A (i.e., the boundary components in A). For $r>1$, $B_r$=set of spatially disassemblable components $C_b$ in the assembly with components $A-(B_{r-1} \cup B_{r-2} \ldots \cup B_1)$. For example, in FIG. 4a, $B_1=\{C_2, C_4\}$, $B_2\{C_5\}$, $B_3=\{C_3\}$ and $B_4=\{C_1\}$. It is conceptually helpful to regard each spatial boundary set $B_r$ as a "peel" or "layer" within A, with $B_1$ being the outermost layer within A, $B_2$ being the next layer when $B_1$ is peeled away, $B_3$ being the next layer when $B_2$ is peeled away, and so on.

(3) Spatial Adjacent Set $SA_i$: As will be discussed below, spatial adjacent sets $SA_i$ are also useful in determining spatial removal influence. The spatial adjacent set of $C_i \in B_r$ is denoted as $SA_i = (B_{r-1} \cup B_{r-2} \ldots \cup B_1)$. For example, in FIG. 4a, $C_3 \cup B_3$ and $SA_3 = \{C_2, C_4, C_5\}$. Similarly, for $C_5 \cup B_2$, $SA_5 = \{C_2, C_4\}$ (4) Spatial Removal Influence $RI_i^j$: As previously noted, spatial removal influence $RI_i^j$ can be expressed for subsets of components as well as single components. If SS denotes a subset of components in A, if in the absence of $SS \subseteq SA_i$ in A, if $\Delta_i$=TRUE along $d_j \in DD$, then the spatial removal influence $RI_i^{SS}$ of SS on $C_i$ along $d_j$ is TRUE ($RI_i^{SS}$=TRUE). For example, in FIG. 4a, $RI_3^{4,5}$=TRUE along $d_1$.

To determine selective disassembly sequences S for assembly A, and to more particularly determine the optimal sequence(s) OS, a Removal Influence Graph is constructed and analyzed. The removal influence graph represents the topological disassembly ordering of components, with its nodes corresponding to components in A and its edges and arcs corresponding to the removal influence $RI_i^{SS}$ between the components. Removal influence $RI_i^{SS}$ is represented in the graph via a hyper-edge from component $C_i$ to the subset of components SS, and $d_j$ is attributed to that edge. Removal influence $RI_i^{SS}$ is also represented by an arc curving about component $C_i$ and passing through component subset SS. In the graph, an adjacent pair of arcs which respectively include nodes for components $C_i$ and $C_j$, and wherein an edge proceeds from the $C_i$ arc to the $C_j$ arc, indicates that component $C_i$ is disassemblable after removing component $C_j$. FIG. 4d illustrates the steps involved in constructing a removal influence graph for the assembly A of FIG. 4a, wherein $C^S = \{C_3\}$.

A selective disassembly sequence $S=[C_{boundary} \leadsto C_x]$ is derivable from the graph (where $[C_{boundary} \leadsto C_x]$ denotes a disassembly order from boundary component $C_{boundary}$ to component $C_x$ in the graph). To illustrate, consider the assembly A of FIG. 4a with the selected target component for disassembly $C^S = \{C_3\}$ and $DD = \{d_1, d_2\}$. $C_3$ is spatially disassemblable along $d_1$ after removing $C_4$ and $C_5$ (i.e., $RI_3^{4,5}$=TRUE), and is represented as shown in FIG. 4b with $d_1$ attributed to that edge. $C_5$ is spatially disassemblable along $d_2$ after removing $C_2$ (i.e., $RI_5^2$=TRUE). $\Delta_4$=TRUE and $\Delta_2$=TRUE for $C_4$ and $C_2$, respectively. Therefore, from the removal influence graph shown in FIG. 4b, $S=[C_2, C_4, C_5, C_3]$ for $C_3$.

Optimal selective disassembly sequences OS are easily derived by topologically sorting the removal influence graph. The nodes in the graph with no directed edges from them, as well as the edges of these nodes, are removed from the graph and the corresponding component name is added to the sequence list. This removal process is recursively followed until the target component $C^S$ is removed from the graph. The sequence with minimal removals is an optimal sequence OS. To illustrate, in FIG. 4b, to disassemble $C_3$, the following optimal sequences are found: $S_1=[C_2, C_4, C_5, C_3]$, $S_2=[C_2, C_5, C_4, C_3]$ and $S_3=[C_4, C_2, C_5, C_3]$.

From the foregoing description, it should be evident that the GSD method can be readily implemented in a computer or similar electronic processing unit. A "pseudocode" representation of the GSD method is shown in FIG. 4c, and a step-by-step illustration of the method for A in FIG. 4a is shown in FIG. 4d. It should be understood that the removal influence graph, while termed a "graph" and shown in graphical form in FIGS. 4b and 4d, need not be in graphical form (and often will not be in such a form); rather, it can simply be provided by any suitable data arrangement representing the nodes, edges, etc. of the graph.

Figure 4F:
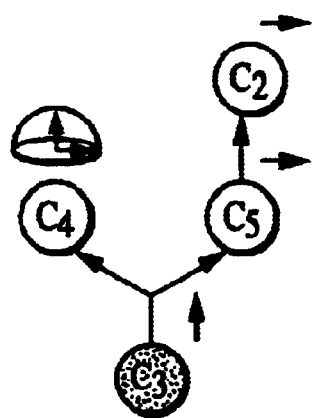
FIG. 4f is a removal influence graph for the assembly A of FIG. 4e, wherein $C^S=\{C_3\}$.

It should also be evident that the GSD method works for assemblies modeled in three dimensions as well as assemblies modeled in two dimensions, as with the MWP and PIE methods to be discussed at greater length below. An example of the application of the GSD method to three-dimensional assemblies is illustrated in FIGS. 4e and 4f. Component $C_3$ in FIG. 4e is disassemblable along direction $d_1$ after removing components $C_4$ and $C_5$, as shown in the removal influence graph of FIG. 4f. Component $C_4$ is disassemblable along a hemispherical range of disassembly directions, and component $C_5$ is disassemblable along direction $d_2$ after removing component $C_2$ along direction $d_2$. Therefore, from the removal influence graph shown in FIG. 4f, the selective assembly/disassembly sequence S=[$C_2$, $C_4$, $C_5$, $C_3$] for selected component $C^S=\{C_3\}$ in FIG. 4e.

The sequence determined by the GSD method is optimal, discussed as follows. Let $R_s$=number of simultaneous removals in S. The attribute of spatial disassemblability $\Delta_x$ for a component $C_x$ determines whether $C_x$ is globally disassemblable by evaluating the spatial constraints of the components. Since the disassemblability of $C_x$ is evaluated for the universe of disassembly directions DD, if $C_x \in B_r$, then $C_x$ could have not been disassemblable at $B_p$ (r>p). Moreover, in evaluating the spatial removal influence of components with respect to $C_x$, only $SS \subseteq SA_x$ are evaluated. Therefore, for $C_x \in B_r$, $R_s$=r for the S determined by the method and the sequence evaluated is an OS. In addition, the spatial removal influence computation further refines the solution set for $C_x$ by ensuring that all $C_i \in SA_x$ do not have to be disassembled for $C_x$, and the number of components s to be selectively disassembled ($1 \leq s \leq n$) for S is minimal among the sequences that can be determined for $C_x \in B_r$. For A in FIG. 4a with the target component $C^S=\{C_3\}$, the optimal sequence OS=[$C_2$, $C_4$, $C_5$, $C_3$] and the number of components disassembled is four (s=4). The number of simultaneous removals $R_s$=3 for this sequence since $C_2$ and $C_4$ can be disassembled simultaneously (disassembled independent of each other). Similarly for A in FIG. 3, with DD=$\{d_1, -d_1, d_2, -d_2, d_3, -d_3\}$ and $C^S=\{C_3\}$, the method determines optimal sequences $OS_1$=[$C_1$, $C_2$, $C_3$] and $OS_2$=[$C_5$, $C_4$, $C_3$] with three disassembled components (s=3) and three simultaneous removals ($R_s$=3).

The GSD method also readily accommodates user-defined constraints. Component grouping can be incorporated in the GSD method by treating the grouped components as a single unit while assembling/disassembling or while checking collision with other components. For example, in FIG. 4a, if $C_2$ and $C_5$ are grouped as a subassembly, then the group $\{C_2, C_5\}$ is constrained along direction $d_1$ by $C_3$ since $C_5$ is constrained by $C_3$ along $d_1$. However $\{C_2, C_5\}$ is not constrained along $d_2$ since $C_2$ is not constrained along $d_2$, and $C_5$ is constrained only by $C_2$ along $d_2$. Geometric constraints such as limitations on the range of component motion, or constraining component removals along one or more disassembly direction(s), can be done by defining $DD_i$=set of disassembly directions for component $C_1$ and using $DD_1$ for $C_1$ instead of DD in the definitions of spatial disassemblability $\Delta_i$ and spatial removal influence $RI_i^j$. For example, in FIG. 3, if component $C_1$ is constrained along direction $-d_3$, then $DD_1=\{d_1, -d_1, d_2, -d_2, d_3\}$; therefore $RI_3^{1,2}$=FALSE along $-d_3$. Similarly, in FIG. 4a, if $C_5$ is totally constrained (i.e., is immobile), then $DD_5=\{\ \}$ and therefore $D_5$=FALSE. Therefore, $B_1=\{C_2, C_4\}$, $B_2=\{\ \}$, and $C_3$ cannot be disassembled.

The GSD method also accommodates selective disassembly of multiple target components within an assembly, as well as disassembly of all components in an assembly (i.e., complete disassembly). When disassembly of multiple target components is to be considered, the GSD method is applied to all of the target components to obtain a combined removal influence graph. The graph is then topologically sorted in the aforementioned fashion to obtain an optimal sequence (or sequences) to disassemble the multiple selected components. When complete disassembly is considered (i.e., where s=n), a removal influence graph can be constructed for all components and can then be topologically sorted to determine optimal sequence(s).

It was previously noted that the OS approaches described in this paper, and therefore the GSD approach, are developed under the presumption that all components within the assemblies being considered are 1-disassemblable (that is, they only require a single linear motion to be removed from their assemblies). However, it is noted that the GSD method (as well as the MWP and PIE methods) can relax the 1-disassemblable assumption, so as to include consideration of complex disassembly directions/paths such as rotations/screw motions and free-form paths. This is particularly useful for allowing the effects of screw-type fasteners to be fully considered.

Regarding the consideration of fasteners (e.g., screws), two different approaches may be taken when they are considered in selective disassembly analysis. First, the fasteners may be modeled as components and considered in the analysis along with the other components. Second, the fasteners need not be modeled as components, but instead can be treated as attributes of their associated components. This approach involves determining S with fasteners ignored, and then determining the fasteners that need to be removed to disassemble the components in the sequence, and determining the resultant sequence appropriately. As an example, let a disassembly sequence S for an assembly A be [$C_1$, $C_2$] with disassembly directions $\{d_1, d_2\}$. Let the fasteners $\{F_3, F_4, F_5\}$ be attributed to $C_1$. Then, if $\{F_3, F_4\}$ are to be disassembled before removing $C_1$ (i.e., if the removal influence of $\{F_3, F_4\}$ on $C_1$ is TRUE along $d_1$), then the resultant sequence is [$F_3$, $F_4$, $C_1$, $C_2$] for the assembly with components and fasteners.

The Multiple Wave Propagation (MWP) Method

As previously noted, the multiple wave propagation (MWP) method is another selective disassembly method utilizing spatial constraints rather than contact geometry to define its operating parameters. It thus provides another powerful tool for assembly/disassembly analysis, though it is not as versatile as the GSD method insofar as its application is limited to single-dependent components, and additionally it is more suitable for application to assemblies A with target components s<<n (i.e., where the number of components s to be selectively disassembled are relatively few in relation to the overall number n of components in the assembly A) and single-dependent components.

The concept underlying the MWP method is that a more optimal disassembly sequence may be obtained if two or more target components are disassembled along a common sequence. The method involves topologically ordering the components in an assembly A with respect to the target components $C^S$ (such orderings being termed "τ waves") and also with respect to the assembly boundary (such orderings being termed "β waves"), and then evaluating intersection events between these waves on a removal influence graph to determine disassembly sequences. Every intersection event determines a disassembly sequence S for one or more target components $C_S$ (with one target component yielding a single sequence S, and multiple target components yielding one or more sequences S). A more detailed description of the MWP method will now be provided.

Figure 7:
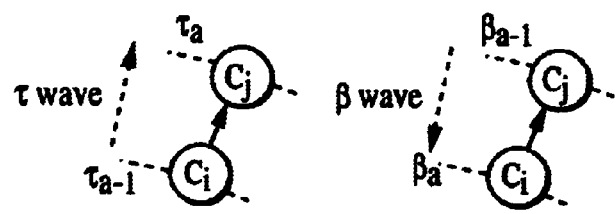
FIG. 7a illustrates a t wave from arc $\tau_{a-1}$ to arc $\tau_a$, where $C_i \in \tau_{a-1}$, $C_j \in \tau_a$.
FIG. 7b illustrates a $\beta$ wave from arc $\beta_{a-1}$ to arc $\beta_a$, where $C_j \in \beta_{a-1}$, $C_i \in \beta_a$.

In the MWP method, two types of disassembly "waves" are defined: τ waves, which define the disassembly ordering of an assembly A with respect to some set of target components $C^S$, and β waves, which define the disassembly ordering of an assembly A with respect to the boundary of A. It is important to note that the "waves" are not physical events in the nature of a propagating mechanical or electromagnetic disturbance; rather, each wave will in fact consist of a set of one or more components of the assembly A. The MWP procedure, and its concept of waves, may be better understood on a conceptual level if the assembly is viewed as layers or peels of components, with the layers/peels being defined by their removal influence $RI_i^j$. Target or $\tau$ waves can be envisioned as layers/peels defined about each of the target components $C^S$, with subsequent layers/peels moving outwardly. The $\tau$ waves move outwardly from each component $C_i$ among the target components $C^S$. It may initially be helpful to envision a "null" $\tau$ wave $\tau_0$ which rests at each component $C_1$ within the target components $C^S$. For subsequent $\tau$ waves $\tau_a$ ($a>0$), $\tau_a$ is the set of components that needs to be removed to disassemble the components in wave $\tau_{a-1}$; i.e., for every component in $\tau_a$ (say $C_j$), there will be at least one component in $\tau_{a-1}$ (say $C_i$) such that the removal influence of $C_j$ on $C_i$ is true ($RI_i^j$=TRUE). Expressed another way, $\tau$ wave propagation from $C_j$ to $C_i$ implies that $C_j$ is removable after removing $C_i$. For example, FIG. 7a illustrates a $\tau$ wave from arc $\tau_{a-1}$ to arc $\tau_a$, where $C_i \in \tau_{a-1}$, $C_j \in \tau_a$, $\Delta_i$=FALSE and $RI_i^j$=TRUE. The $\tau$ wave from $C_i$ to $C_j$ implies that $C_i$ is disassemblable after removing $C_j$.

Boundary or $\beta$ waves may then be envisioned as layers/peels starting with the components at the boundary of the assemble, with subsequent layers/peels moving inwardly, and with each wave encompassing the components in the spatial boundary sets $B_r$. Thus, $\beta_1$ extends between the components in $B_1$ (i.e., the set of $C_b$'s in the assembly A), $\beta_2$ extends between the components in $B_2$ (the set of $C_b$'s in $A-B_1$), and so on. To illustrate, in FIG. 7b, the $\beta$ wave from arc $\beta_{a-1}$ to arc $\beta_a$, where $C_j \in \beta_{a-1}$ and $C_i \in \beta_a$, implies that the minimum number of components to be removed to disassemble $C_j$ from A is $a-1$, since the components are single-dependent and there are $a-1$ arcs to be traversed by the $\beta$ wave (i.e., $a-1$ component removal steps) to reach $C_j$.

Figure 8:
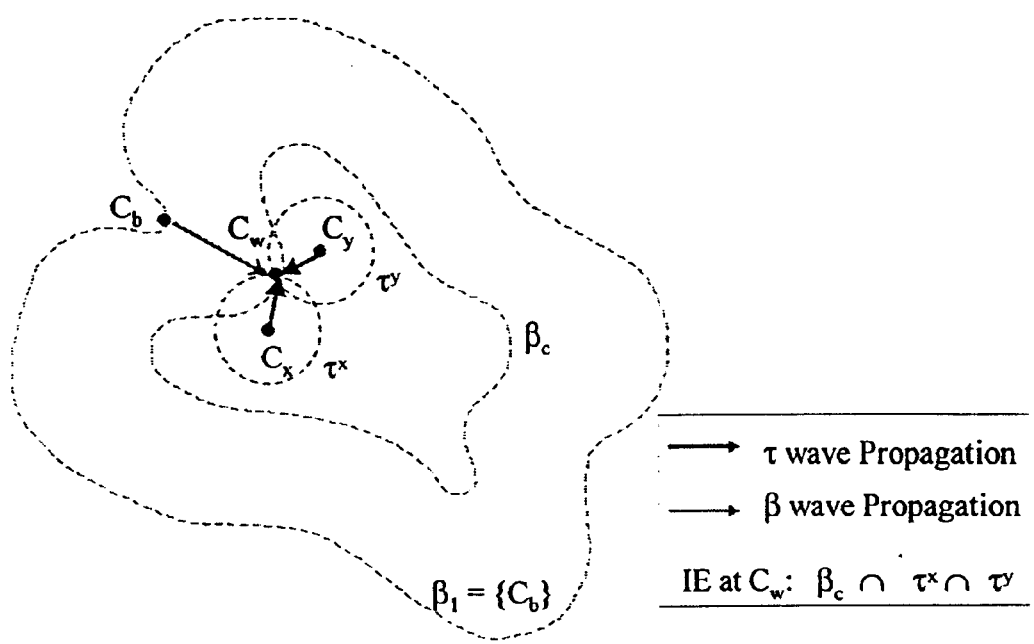
FIG. 8 illustrates an intersection event of $\tau$ and $\beta$ waves for $C^S=\{C_x, C_y\}$ in the Multiple Wave Propagation (MWP) method.

After a removal influence graph is constructed for the set of target components $C^S$, a sequence to disassemble $C^S$ can be determined based on intersection events between $\tau$ waves from components $C^S$ and $\beta$ waves from the boundary of A: the intersections of the $\tau$ waves and $\beta$ waves—which may also be regarded as the common components shared by the "peels" or "layers" of the $\tau$ waves and $\beta$ waves—define the intersection events for the target components $C^S$. Defined formalistically, an intersection event is an intersection of any m ($1 \leq m \leq s$) $\tau$ wave(s) $\tau^{x1}, \tau_{x2}, \ldots, \tau^{xm}$ (where $C_{x1}, C_{x2}, \ldots, C_{xm} \in C^S$) and a $\beta$ wave at $C_w \in A$ (which implies that $C_w \in \tau^{x1}, \tau^{x2}, \ldots, \tau^{xm}, \beta$). Every occurrence of an intersection event for m ($>0$) $\tau$ wave(s) ($\tau^{x1}, \tau^{x2}, \ldots, \tau^{xm}$) determines $S=\{C_{boundary} \leadsto C_w, C_w \leadsto C_{x1}, C_w \leadsto C_{x2}, \ldots, C_w \leadsto C_{xm}\}$ for $C^S = \{C_{x1}, C_{x2}, \ldots, C_{xm}\} \in C^S$ and $C_w \in A$. For example, FIG. 8 illustrates an intersection event for $C^S = (C_x, C_y)$ and the corresponding $S = [C_{boundary} \leadsto C_w, C_w \leadsto C_x, C_w \leadsto C_y]$. The components at the wave intersections help to establish optimal disassembly sequences, as will be discussed below. The shapes of the waves in the geometry space are irrelevant; the waves merely provide the topological ordering of the components in the assembly with respect to either the target components $C^S$ or the boundary of A.

Figure 9:
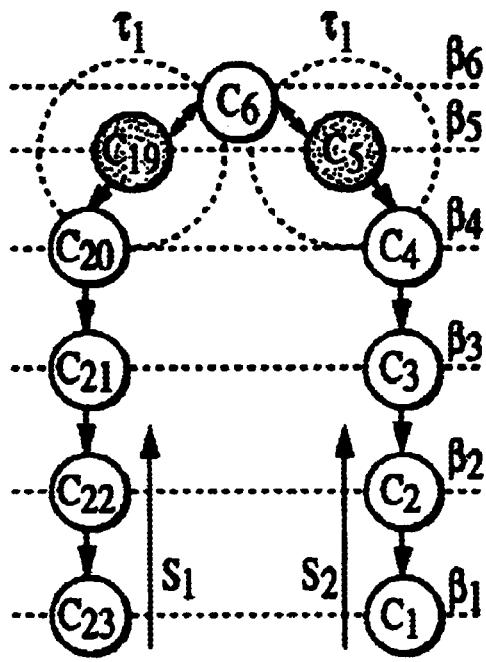
FIG. 9 is a removal influence graph for the assembly A of FIG. 6, wherein $C^S=\{C_5, C_{19}\}$.

Every occurrence of an intersection event for a $\beta$ wave and $0 < m \leq s$ $\tau$ wave(s) (waves $\tau^{y1}, \tau^{y2}, \ldots, \tau^{ym}$ from components $C_{y1}, C_{y2}, \ldots, C_{ym}$) can assist in determining disassembly sequences S for $CI=\{C_{y1}, C_{y2}, \ldots, C_{ym}\}$, where $CI \subseteq C^S$. In essence, the intersections define the "critical components" (hereinafter "intersection components") that must be in the disassembly sequence(s) S for the components $C_{y1}, C_{y2}, \ldots, C_{ym}$ whose $\beta$ and $\tau$ waves define the intersections. Therefore, to find a disassembly sequence for all of $C_{y1}, C_{y2}, \ldots, C_{ym}$, one first finds the intersection component(s) at the intersections of the $\tau$ waves from $C_{y1}, C_{y2}, \ldots, C_{ym}$ and the $\beta$ waves. For example, FIG. 9 shows the removal influence graph for the target components $C^S = \{C_5, C_{19}\}$ for the gear reducer assembly in FIG. 6. An intersection event occurs at the intersection component $C_6$: ($\tau_1$ of $C_5$)$\cap$($\tau_1$ of $C_{19}$)$\cap$($\beta_6$ at $C_6$), thus $CI=C_5, C_6, C_{19}$. Then, disassembly sequences for the intersection components—these disassembly sequences being determined by topologically sorting the graph—will assist in defining disassembly sequences S for $C_{y1}, C_{y2}, \ldots, C_{ym}$. The removal influence graph may be sorted as in the GSD method, moving inwardly from the boundary components to the intersection components. In FIG. 9, sorting the graph to $C_6$ yields the sequences $[C_1, C_2, C_3, C_4, C_5, C_6]$ and $[C_{23}, C_{22}, C_{21}, C_{20}, C_{19}, C_6]$. The graph may then be sorted from each of the intersection components to each of the target components (or vice versa); in FIG. 9, sorting from $C_6$ to the target components $C^S$ and $C_{19}$ expands the prior sequences to yield $S_1=[C_1, C_2, C_3, C_4, C_5, C_6, C_{19}]$, $S_2=[C_{23}, C_{22}, C_{21}, C_{20}, C_{19}, C_6, C_5]$. The disassembly sequences $S_1$ and $S_2$ may then be compared to determine an OS for $C^S$. Those sequences with the least number of disassembly steps will constitute the optimal sequences OS, provided the criterion for an "optimal sequence" is minimum disassembly steps. (As previously noted, an optimal sequence may instead constitute the sequence with minimal cost or minimal disassembly time, which may not necessarily correspond to the sequence with minimal disassembly steps; however, in general, sequences with minimal disassembly steps will be those with minimal disassembly time and cost.)

If an intersection event only occurs for one target component—that is, if m=1 and a $\beta$ wave only intersects a single $\tau$ wave—this illustrates that there is a disjoint sequence for the single target component $C_{y1} \in C^S$: the intersection event defines a disassembly sequence for that target component only. However, for m>1 (i.e., if there is an intersection or intersections between a $\beta$ wave and a number of $\tau$ waves m), the intersection event determines a common sequence to disassemble all the m target components $C_{y1}, C_{y2}, \ldots, C_{ym} \in C^S$. Stated another way, if in A, there is no intersection event of m ($>0$) $\tau$ wave(s) ($\tau^{y1}, \tau^{y2}, \ldots, \tau^{ym}$) with a $\beta$ wave at some component $C_w \in A$, then there exists no common disassembly sequence S for $\{C_{y1}, C_{y2}, \ldots, C_{ym}\}$ of type $[C_{boundary} \leadsto C_w, C_w \leadsto C_{y1}, \ldots, C_w \leadsto C_{ym}]$.

The computational complexity of the MWP approach is of order $O(n^2 2^s)$. For $s << n$, this abstraction is computationally feasible, and is efficient compared to an enumeration approach of computational complexity $O(2^n)$.

The Priority Intersection Event (PIE) Method

The priority intersection event (PIE) method is another selective disassembly method utilizing spatial constraints rather than contact geometry. As previously noted, it is applicable for assemblies A containing single-dependent components, and is preferred for use over the MWP method where the number s of target components $C^S$ approaches the total number of assembly components n. As s→n, the MWP method becomes computationally burdensome (being of order $O(n^2 2^s)$), whereas the PIE method is still efficient, being of order $O(n^2)$. The PIE method involves defining $\tau$ and $\beta$ waves and their intersections, similar to the MWP method. However, to reduce processing burden, the intersection events are prioritized and an optimal sequence is determined in polynomial time by evaluating only the candidate events for optimal sequencing. In effect, the minimum component removal sequences are locally determined.

In the PIE method, $\tau$ and $\beta$ waves are defined as in the MWP method, but for every time step T (for every advance of one $\tau$ wavefront), the $\tau$ wave advances by one wavefront and the $\beta$ wave advances by s wavefronts (s being the number of target components). In the forthcoming discussion, the following nomenclature will be used:

$\tau^x$: $\tau$ wave of component $C_x$;

$\tau^x_a$: $a^{th}$ wavefront of $\tau^x$ wave from component $C_x$ (i.e., the wavefront of the $\tau^x$ wave from component $C_x$ at time T=a);

$\beta_a$: $a^{th}$ wavefront of $\beta$ wave from the boundary of A; and $\beta^m$: $\beta_1 \cup \beta_2 \ldots \cup \beta_{(m*T)}$, where $1 \leq m \leq s$. Recalling that each $\beta$ wave encompasses the components in the spatial boundary sets $B_r$, i.e., $\beta_1 = B_1$, $\beta_2 = B_2$, etc., $\beta^m$ can also be viewed as $B_1 \cup B_2 \ldots \cup B_{(m*T)}$.

Figure 10:
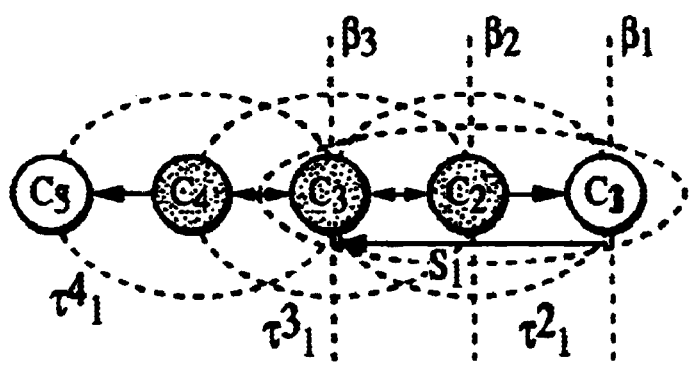
FIG. 10 is a removal influence graph at T=1 for the assembly A of FIG. 6, wherein $C^S=\{C_2, C_3, C_4\}$.

A time-based intersection event (TIE) is then defined as the intersection of m $\tau$ waves and $\beta^m$ at some component $C_w \in A$, where $1 \leq m \leq s$ (s being the number of target components). To illustrate, FIG. 10 shows $\tau$ and $\beta$ waves for the gear reducer assembly in FIG. 6 with target components $C^S = \{C_2, C_3, C_4\}$ at T=1, where $\beta^1 = \beta_1$, $\beta^2 = \beta_1 \cup \beta_2$, $\beta^3 = \beta_1 \cup \beta_2 \cup \beta_3$. At T=1:

a TIE occurs at $C_1$, where 1 $\tau$ wave intersects $\beta^1$: $\tau^2_1 \cap \beta^1$;

a TIE occurs at $C_2$, where 2 $\tau$ waves intersect $\beta^2$: $\tau^2_0 \cap \tau^3_1 \cap \beta^2$; and a TIE occurs at $C_3$, where 3 $\tau$ waves intersect $\beta^3$: $\tau^2_1 \cap \tau^3_0 \cap \tau^4_1 \cap \beta^3$.

Figure 6:
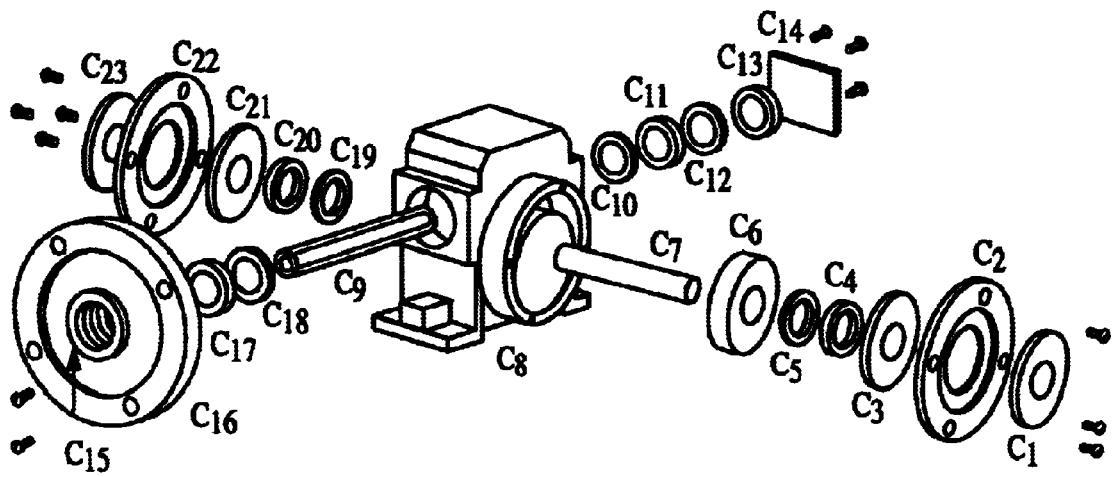
FIG. 6 is a perspective view of another exemplary assembly A.
Figure 11:
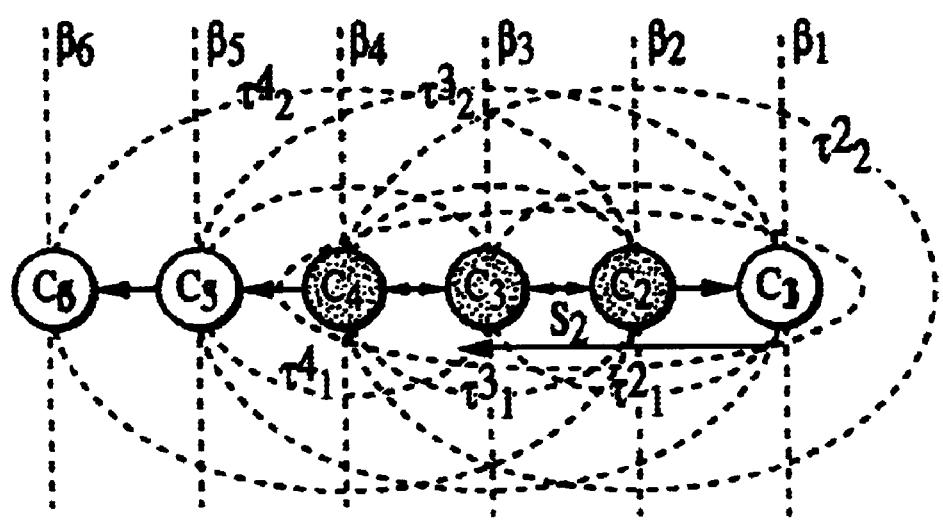
FIG. 11 is a removal influence graph at T=2 for the assembly A of FIG. 6, wherein $C^S=\{C_2, C_3, C_4\}$.

FIG. 11 then shows the removal influence graph for the gear reducer assembly in FIG. 6 with the same target components $C^S = \{C_2, C_3, C_4\}$ at T=2. At T=2, keeping in mind that $\beta^m = \beta_1 \cup \beta_2 \ldots \cup \beta_{(m*T)}$:

$\beta^1 = \beta_1 \cup \beta_2$;

$\beta^2 = \beta_1 \cup \beta_2 \cup \beta_3 \cup \beta_4$;

$\beta^3 = \beta_1 \cup \beta_2 \cup \beta_3 \cup \beta_4 \cup \beta_5 \cup \beta_6$.

Looking to $C_2$, five TIE's occur:

$\tau^2_0 \cap \tau^3_1 \cap \tau^4_2 \cap \beta^3$ (three $\tau$ waves intersecting $\beta^3$);

$\tau^2_0 \cap \tau^3_1 \cap \beta^2$ (two $\tau$ waves intersecting $\beta^2$);

$\tau^2_0 \cap \tau^4_2 \cap \beta^2$ (two $\tau$ waves intersecting $\beta^2$);

$\tau^3_1 \cap \tau^4_2 \cap \beta^2$ (two $\tau$ waves intersecting $\beta^2$);

$\tau^4_2 \cap \tau^1$ (one $\tau$ wave intersecting $\beta^1$).

Whereas the MWP method determines all intersection events—an exponential number—the PIE method defines a polynomial number of TIE's (or simply "priority events") which are necessary candidates for the optimal sequence OS, each priority event determining a locally minimum component removal sequence. In effect, it prioritizes the intersection events of the MWP method so that only those relevant for the optimal sequence OS are reviewed. In essence, only a subset of the intersections of the MWP method are determined. The priority events may be processed in the same manner as the intersections in the MWP method (e.g., by topologically sorting the removal influence graph and moving inwardly from the boundary components to the components where the priority events occur, and in turn to the target components) to yield candidate disassembly sequences S. The order of priority event occurrence in A depends on the geometric configuration of the components in A.

Let $[C_i \rightarrow C_j]$ denote a minimal-component removal sequence from $C_i$ to $C_j$. The first intersection of a $\tau$ wave for some component $C_x \in C^S$ (which gives rise to $\tau^x$ wave creating the TIE) with a $\beta^1$ wave at some component $C_w \in A$ is a priority event. This priority event determines a priority disjoint sequence $S = [C_{boundary} \rightarrow C_w \rightarrow C_x]$ for $\{C_x\} \in C^S$ (i.e., the TIE defines a disassembly sequence only for the target component $C_x$ which gives rise to the $\tau^x$ wave creating the TIE). In the foregoing example, this can be seen in FIG. 10 where $\tau^2_1 \cap \beta^1$ at $C_1$. This defines $S = [C_1, C_2]$ for $\{C_2\} \in C^S$.

Otherwise, for $CI = \{C_{x1}, C_{x2}, \ldots, C_{xm}\} \subseteq C^S$, a TIE between m (>0) t waves ($\tau^{x1}, \tau^{x2}, \ldots, \tau^{xm}$) with a $\beta^m$ wave at some component $C_w \in A$ is a priority event, if the number of components in the sequence $S = [C_{boundary} \rightarrow C_w, C_w \rightarrow C_{x1}, C_w \rightarrow C_{x2}, \ldots, C_w \rightarrow C_{xm}]$ less than the sum of the total number of components in the priority disjoint sequences for all $\{C_x\} \in CI$. For example, in FIG. 11a, at $C_3$, m=2 and the TIE ($\tau^3_0 \cap \tau^4_1 \cap \beta_3$) is a priority event that defines $S = [C_1, C_2, C_3, C_4]$ for $\{C_3, C_4\} \subseteq C^S$, where the priority disjoint sequence for $\{C_3\} \in C^S$ is $S = [C_1, C_2, C_3]$ and for $\{C_4\} \in C^S$ is $S = [C_6, C_5, C_4]$. The sum of the total number of components in the disjoint sequences for $\{C_3, C_4\}$ is 6, which is higher than the number of components in the sequence $S = [C_1, C_2, C_3, C_4]$ determined for $\{C_3, C_4\} \subseteq C^S$. Similarly, for the example in FIG. 11, at $C_2$, m=3 and the TIE ($\tau^2_0 \cap \tau^3_1 \cap \tau^4_2 \cap \beta_2$) is a priority event that defines $S = [C_1, C_2, C_3, C_4]$ for $\{C_2, C_3, C_4\} \subseteq C^S$. For the gear reducer assembly of FIGS. 6, 10, and 11 with $C^S = \{C_2, C_3, C_4, C_{12}, C_{13}, C_{20}, C_{21}, C_{22}\}$, an OS generated from the PIE method is $[C_1, C_2, C_3, C_4, C_{23}, C_{22}, C_{21}, C_{20}, C_{14}, C_{13}, C_{12}]$.

Implementation

The invention is exemplified by a software system called Assembly/Disassembly in Three Dimensions (A3D), which was developed at the I-CARVE Lab of the University of Wisconsin-Madison. A3D, which implements the foregoing selective disassembly methods, allows designers and engineers to perform automated assembly and disassembly analysis of CAD models. A view of the A3D user interface is shown in FIG. 12, and a brief summary of the A3D system will now be provided to illustrate the utility of the invention.

A3D System: Functional Features

The A3D system, which operates on the Unix and Windows-NT platforms, uses C++ as a programming language, OpenGL™ as the graphics library, WorldToolKit™ (Engineering Animation, Inc., San Francisco, Calif., USA) as a development library and ACIS™ (Spatial Technology, Inc., Boulder, Colo., USA) for geometric computations. It should be understood that if the invention is embodied in forms other than A3D, these embodiments may use other programming languages, operating platforms, etc. A3D advantageously:

Performs automated selective assembly/disassembly (for a subset of components in A) or complete assembly/disassembly (for all components in A).

Maintains a hierarchical assembly structure (i.e., the assembly relationships between components are maintained when the components are disassembled).

Checks the static assembly for intersections (interlocking components) and clearances between components.

Allows the user to add and remove directional constraints, and generates the resultant assembly/disassembly sequence(s) and paths.

Allows the user to group/ungroup components and generates the resultant sequence and paths.

Allows the user to edit the overall component shape (stretching, scaling, and transforming of components), and generates the resultant sequence and paths.

Allows the user to edit assembly/disassembly sequences & paths and validates edited sequences/paths.

Displays and animates assembling and disassembling, and provides visualization features such as Zoom/Pan/Rotate and transformation.

Reads/saves assembly/disassembly sequences and paths from/to a file. Assembly CAD models created from different modelers in different file formats may be read, including SAT, IGES, STL, DXF, RENDER, WAVEFRONT and VRML.

Operating modes include display via mono (2-D) or VR/stereographic (3-D) viewing, with inputs via standard (e.g., mouse) or VR input devices.

Designers use different existing CAD systems (e.g., ProEngineer™, UniGraphics™ and SolidWorks™) to create 3-D models of assemblies. However, the existing CAD systems do not perform assembly/disassembly analysis. The A3D system has been developed independently of the existing CAD systems so that CAD models can be created in the different existing systems, but can be analyzed more efficiently and rapidly for assembly/disassembly in the A3D system. To allow greater compatibility with the different CAD systems, standard CAD model file formats such as SAT, IGES, STL, DXF, RENDER, WAVEFRONT and VRML are supported. After reading a CAD model file, the A3D system automatically collects the assembly model and the A3D analysis results in an A3D file. The user can load an A3D file, perform analysis, and save the results to the file.

The components to be assembled/disassembled are specified by the designer using the OpenGL™ and the Motif graphical user interface. To automatically generate an optimal disassembly/assembly sequence and paths for the selected components, the previously discussed selective disassembly methods (GSD, MWP and PIE) are used. As previously noted, the methods analyze the spatial constraints of the assembly geometry in evaluating the accessibility of components, which is followed by determining the topological ordering of the components to evaluate an optimal assembly/disassembly sequence OS. A hierarchical assembly structure is maintained, allowing the user to add constraints, edit component shapes, and compute the resultant disassembly sequence and paths.

The user can add constraints to the component geometry that restrict some assembly/disassembly operations. User-defined constraints include component grouping (two or more components are grouped as a subassembly) and directional constraints (one or more assembly or disassembly directions of components are constrained). For example, a set of components may be grouped based on the functionality of the subassembly. As another example, directional constraints may be used to specify the restrictions in component removal directions due to fixtures, workspace requirements, etc.

To enhance the utility of the A3D system, editing features have been added to allow the user to edit sequences, generate complex paths/motions of components, and validate the resultant assembly/disassembly operation. In addition, the user can perform several other virtual manufacturing analyses useful in assessing product design, such as interception checking, clearance checking, accessibility analysis of components, and design rule checking.

For feasibility and ergonomic analysis of assembling and maintenance applications, it is also useful to incorporate a virtual human in assembly/disassembly analysis. Therefore, apart from a regular "mono-mode" interface for A3D, a VR (Virtual Reality) interface has also been developed. Visual immersion is provided by providing parallax views of the CAD model (i.e., views imaged from different angular viewpoints) on a display means for displaying the parallax views, e.g., a computer monitor or a vertical projection screen, and then providing viewing means whereby the parallax views are combined into a stereographic view of the CAD model. This scheme has been executed in A3D by displaying the parallax views of the CAD model on computer monitors and/or projection screens in rapid alternating succession, and then providing a pair of eyeglasses wherein each "lens" of the glasses is a shutter which may be opened and closed. When these shutters rapidly open and close in alternating succession in synchronization with the alternating parallax views on the display means, one of the parallax views is always viewed by one eye through one shutter, and the other parallax view is always viewed by the other eye through shutter. Stereoscopic view generators of this type are known and are provided (for example) by the CrystalEyes™ system (StereoGraphics Corporation, San Rafael, Calif., USA), wherein the shutters of the eyeglasses are liquid crystal displays which allow a viewer's left eye to see only one parallax view and the right eye to see only the other parallax view, with the display means alternating the parallax views 120 times per second. As a result, a human viewer effectively perceives the separately-displayed parallax views as a single three-dimensional image. Advantageously, the CrystalEyes™ eyeglasses communicate with the display means by an infrared signal, and thereby a number of eyeglasses may be worn by a number of viewers simultaneously with complete freedom of movement within 8–10 feet of the display means. This is preferable in comparison to viewing through VR helmets and similar devices which only allow a single user to view the CAD model at a time. Other means for stereoscopically combining parallax views can additionally or alternatively be used in place of the CrystalEyes™ scheme, with almost any such means known to the prior art being suitable for use in the invention. As examples, parallax views can be combined using a wide variety of known means whereby each shutter of a pair of eyeglasses masks one image from view (e.g., as in common red/green "3-D glasses").

Similarly, the A3D system allows inputs via a wide variety of input means for interacting with the program, such as standard keyboard and mouse, trackball, or joystick inputs. Alternatively, A3D may use "multi-dimensional" input means which have been specially designed for use in VR systems, e.g., 6-D mice, trackballs, force balls, joysticks, instrumented gloves, and trackers (e.g., devices which detect multidimensional motion through electromagnetic or ultrasonic means). Trackers, such as the Flock of Birds™ tracker sold by Ascension Technology Corporation (Burlington, Vt., USA), are particularly preferred because they allow the user to provide motion inputs which are unrestrained by cables and the like. Voice input microphones are also provided for reception of voice commands, which advantageously allows a user to utilize motion inputs to "grasp" and manipulate the CAD model and then provide voice commands to execute actions which are less analogous to motion-simulative actions (e.g., on/off commands such as "rotate on" or "rotate off" and processing commands such as "insert" or "remove", as opposed to grasping and manipulation commands). As a result, the multi-sensory VR interface allows the user to combine voice and hand inputs to manipulate and analyze objects in the design space. Either prior to or after the generation of the assembly/disassembly sequence and paths, the designer in the VR environment can grasp objects with his/her hands and move them around, detach parts from assemblies, and attach new parts to assemblies for virtual manufacturing analysis. The VR environment is beneficial because it allows intuitive interaction with the model, and it thereby allows a designer to analyze shapes quickly and efficiently for maintenance/assembly applications.

A3D System: Results

The assembly and disassembly analysis of A3D has been applied to several automotive, aircraft and electronic subassemblies. Results from preliminary testing show A3D evaluates an optimal solution with acceptable computational complexity for assembly/disassembly analysis. This section presents some preliminary implementation results of the selective disassembly methods in the A3D system.

A3D Results: Spatial Constraints and Sequence Determination

Figure 13:
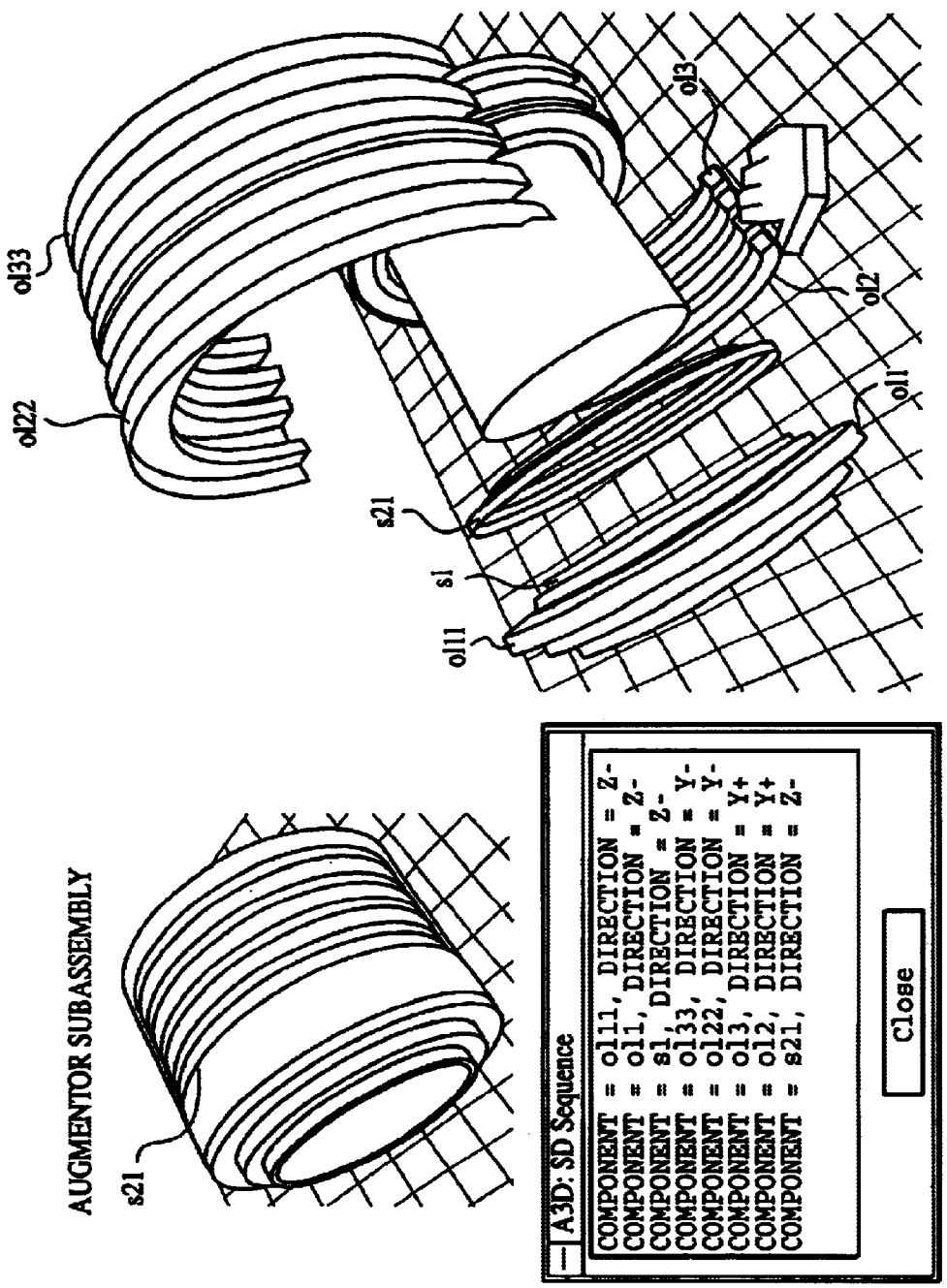
FIG. 13 is another view of an exemplary A3D display obtained from a computer monitor illustrating assembled and disassembled views of an augmentor subassembly.
Figure 14B:
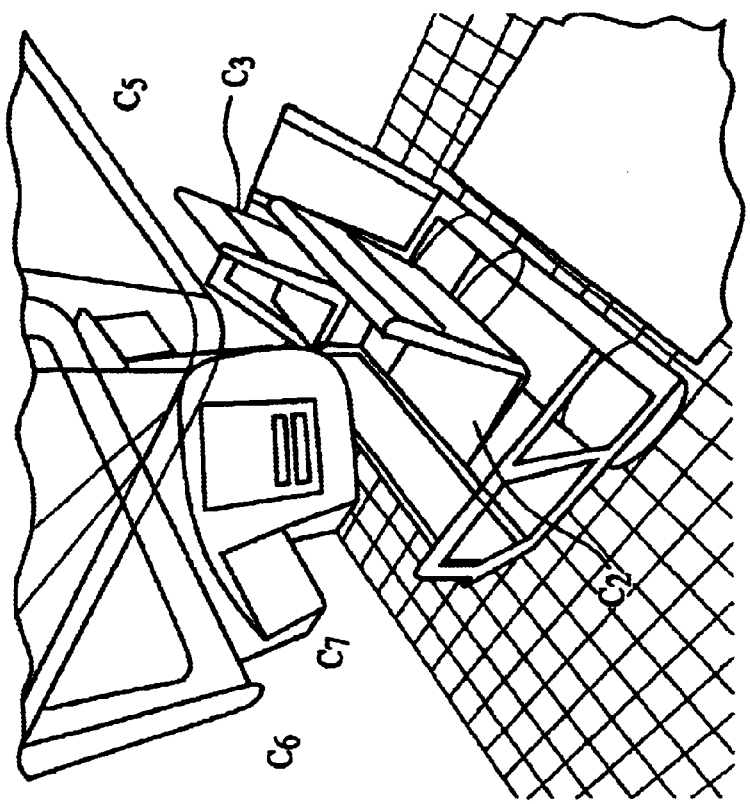
Figure 14A:
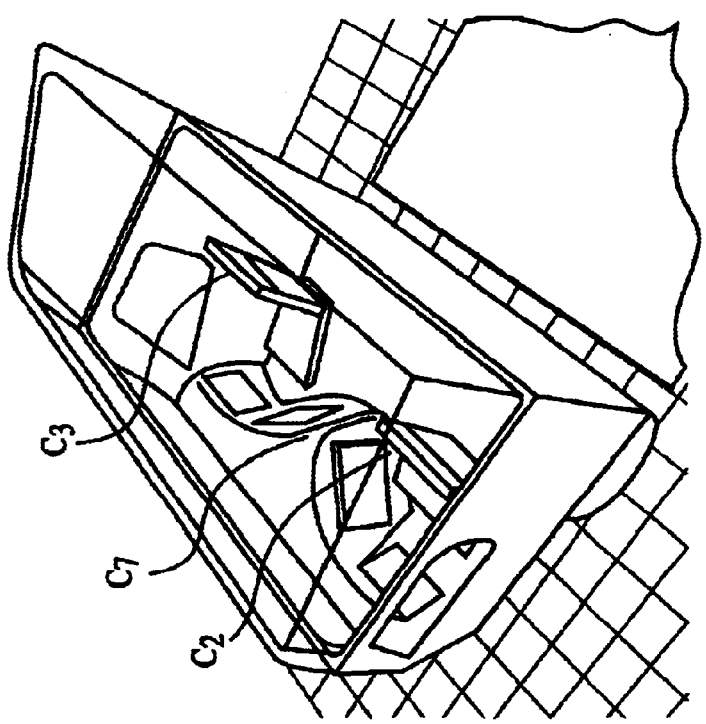
FIG. 14a is another view of an exemplary A3D display obtained from a computer monitor illustrating a CAD model of a cab subassembly.

A component $C_i \in \mathbf{0} A$ may constrain another component $C_j \in A$ both by contact and also spatially. For example, in the CAD model of an augmentor subassembly shown in FIG. 13, o122 is constrained by o111 (both by contact and spatially). Therefore, even between two mating components, to ensure global disassembly, analyzing contact geometry alone is not sufficient and spatial analysis is necessary. The selective disassembly methods discussed earlier in this document analyze the spatial constraints imposed by both contact and non-contact geometry. In FIG. 13, OS=[o111, o11, s1, o133, o122, o13, o12, s21] generated for $C^S=\{s21\}$ with $n_s=8$ and $R_s=5$. As another example, for the cab subassembly shown in FIG. 14a, FIG. 14b shows a common sequence OS=[$C_5$, $C_6$, $C_2$, $C_3$, $C_7$] generated for the selected set of components $C^S=\{C_2, C_3, C_7\}$.

A3D Results: Grouping Components and Sequence Determination

Figure 16:
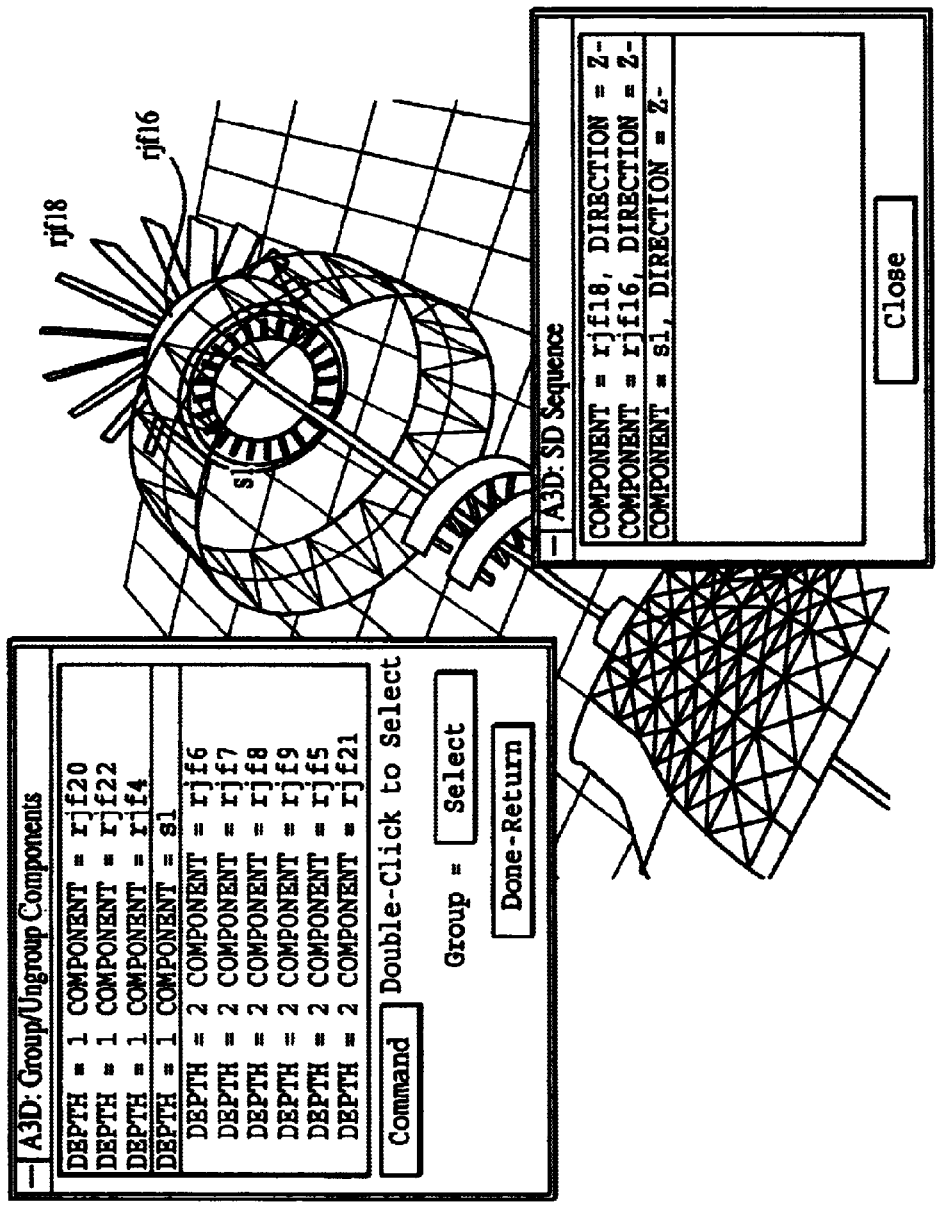
FIG. 16 is another view of an exemplary A3D display obtained from a computer monitor illustrating another disassembled view of the aircraft engine subassembly of FIG. 15, with components $C^S=\{rjf5, rjf6, rjf7, rjf8, rjf9,$ and $rjf21\}$ grouped as a subassembly.

Subassemblies (grouped components) may change S and disassembly directions for components. A3D determines S for subassemblies by grouping the subassembly components as a single unit (e.g., a single node in a removal influence graph/analysis). For example, FIG. 15 shows the CAD model of an aircraft engine subassembly, and OS=[rjf18, rjf16, rjf5, rjf9, rjf8, rjf4, rjf7, rjf6, rjf21] generated for $C^S=\{rjf21\}$ with no components grouped; $n_s=9$ and $R_s=5$. With components grouped as a subassembly S1={rjf5, rjf6, rjf7, rjf8, rjf9, rjf21}, FIG. 16 shows OS=[rjf18, rjf16, S1] generated for $C^S=\{S1\}$ with $n_s=3$ and $R_s=2$. FIG. 16 provides a partial illustration of the user interface for specifying subassemblies.

A3D Results: Directional Constraints and Sequence Determination

Figure 17:
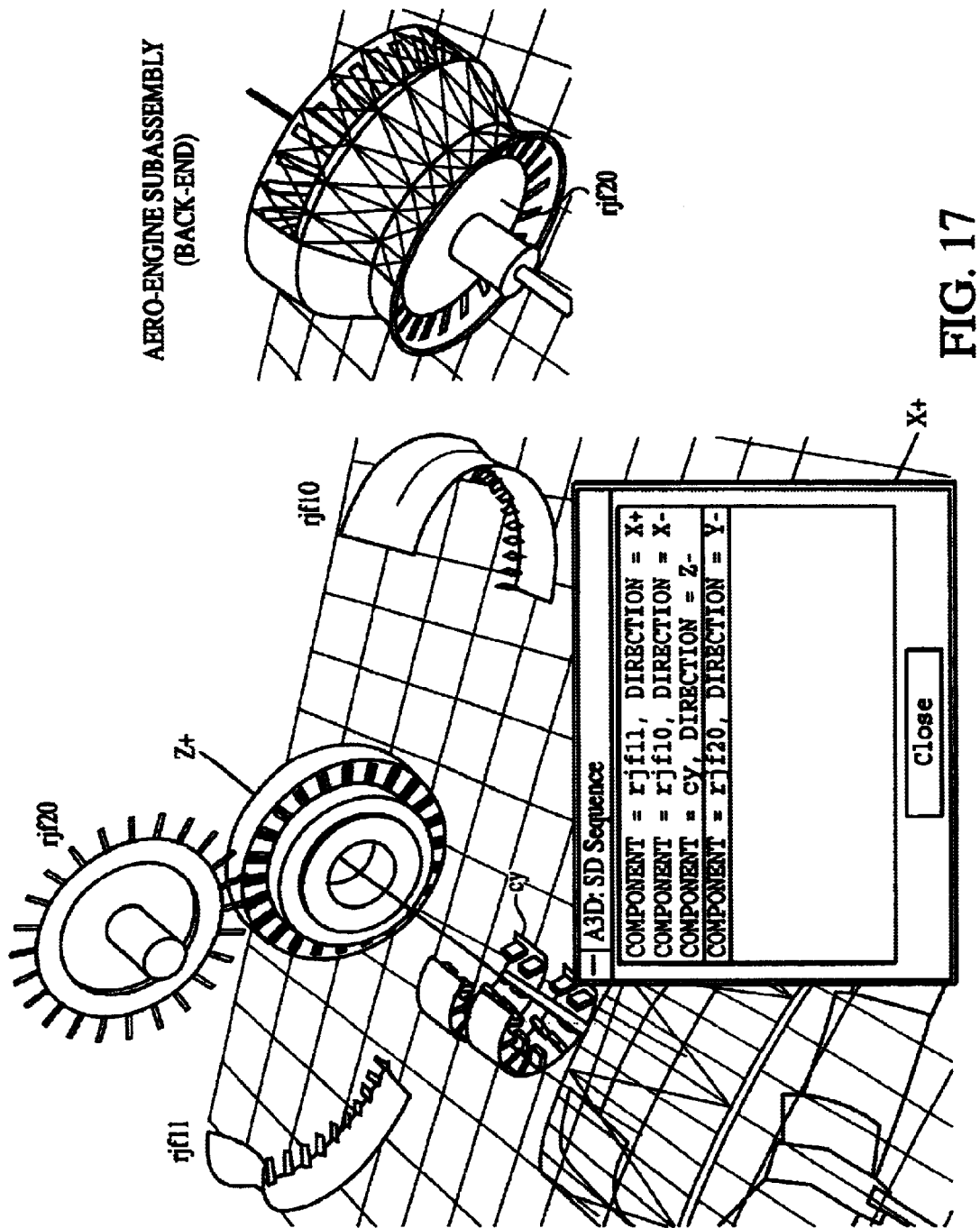
FIG. 17 is another view of an exemplary A3D display obtained from a computer monitor illustrating another disassembled view of the aircraft engine subassembly of FIGS. 15 and 16, wherein $C^S=\{rjf20\}$.
Figure 18:
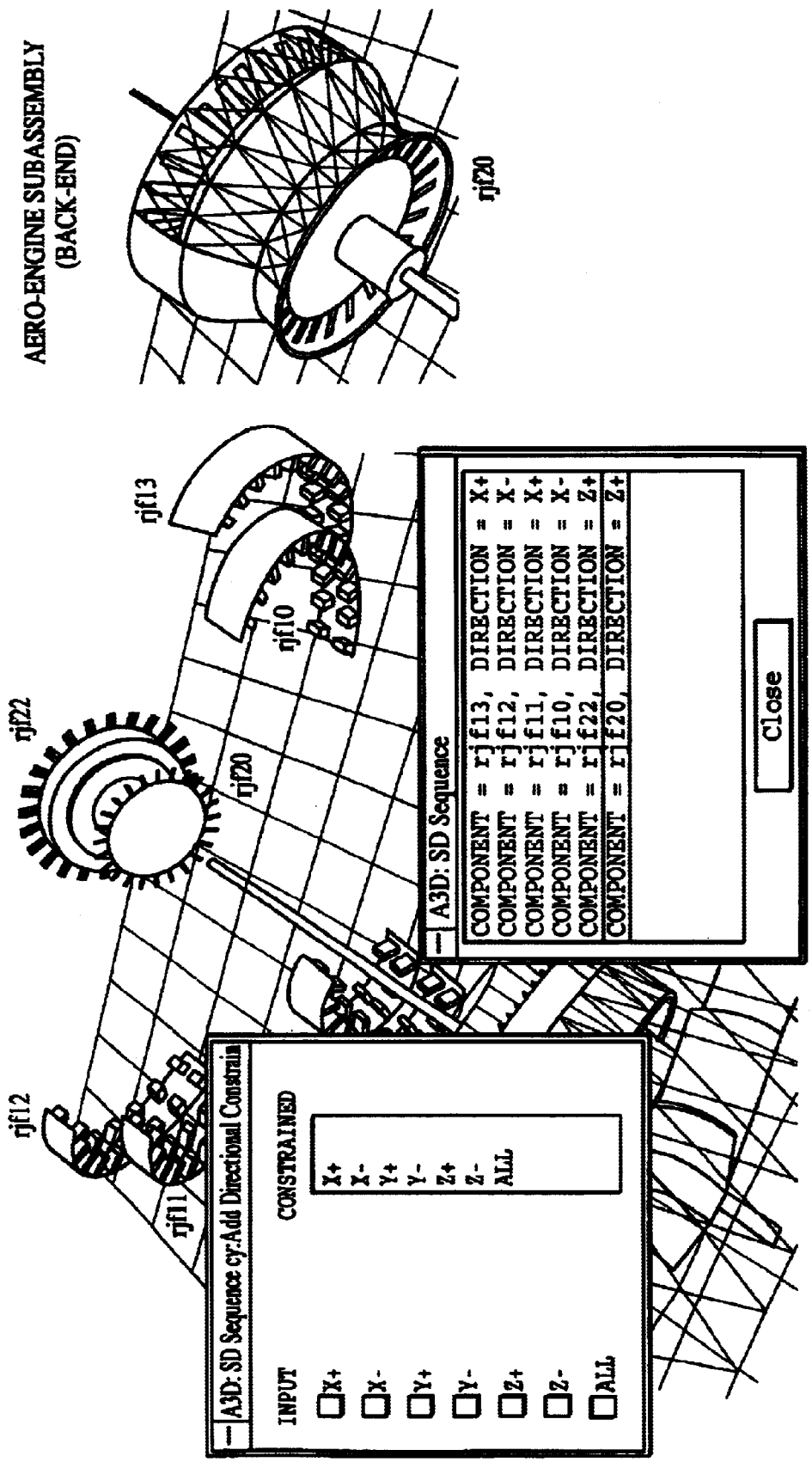
FIG. 18 is another view of an exemplary A3D display obtained from a computer monitor illustrating another disassembled view of the aircraft engine subassembly of FIGS. 15–17, with $C^S=\{rjf20\}$ and component cy constrained from moving.

The A3D system allows the user to add directional constraints along one or more disassembly directions of a component and automatically computes the resultant S. For example, FIG. 17 shows the CAD model of an aircraft engine subassembly and OS=[rjf11, rjf10, cy, rjf20] generated for $C^S=\{rjf20\}$ without any directional constraints; $n_s=4$ and $R_s=3$. However, if the user constrains cy from moving, then the resultant OS =[rjf13, rjf12, rjf11, rjf10, rjf22, rjf20], generated for $C^S=\{rjf20\}$ with $n_s=6$ and $R_s=4$, as shown in FIG. 18.

A3D Results: Overall Shape Editing and Sequence Determination

Figure 19A:
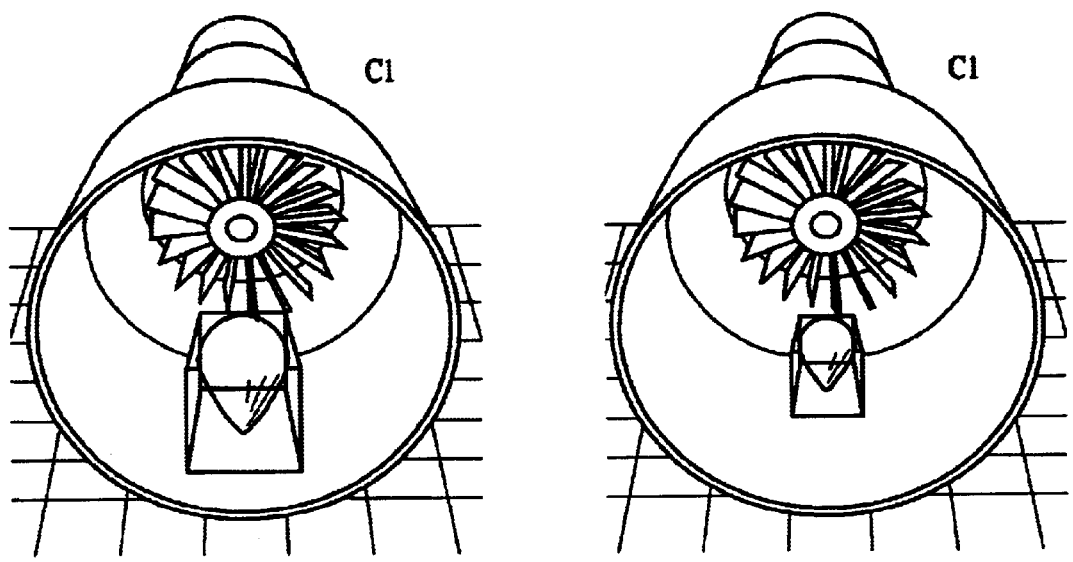
FIG. 19a is another view of an exemplary A3D display obtained from a computer monitor illustrating disassembly sequence validation after editing of the geometry of a component.

The A3D system allows the user to edit the overall shape of a component or components and generate the resultant assembly/disassembly sequence after the modification(s) are effected. Moreover, the user can also validate whether a predetermined sequence (based on the old configuration) is valid for the modified assembly geometry, after the geometry editing. For example, FIG. 19a shows a disassembly for component C1 before and after editing its geometry, and validation of the predetermined disassembly sequence for the modified geometry.

A3D Results: Sequence Editing and Validation

Figure 19B:
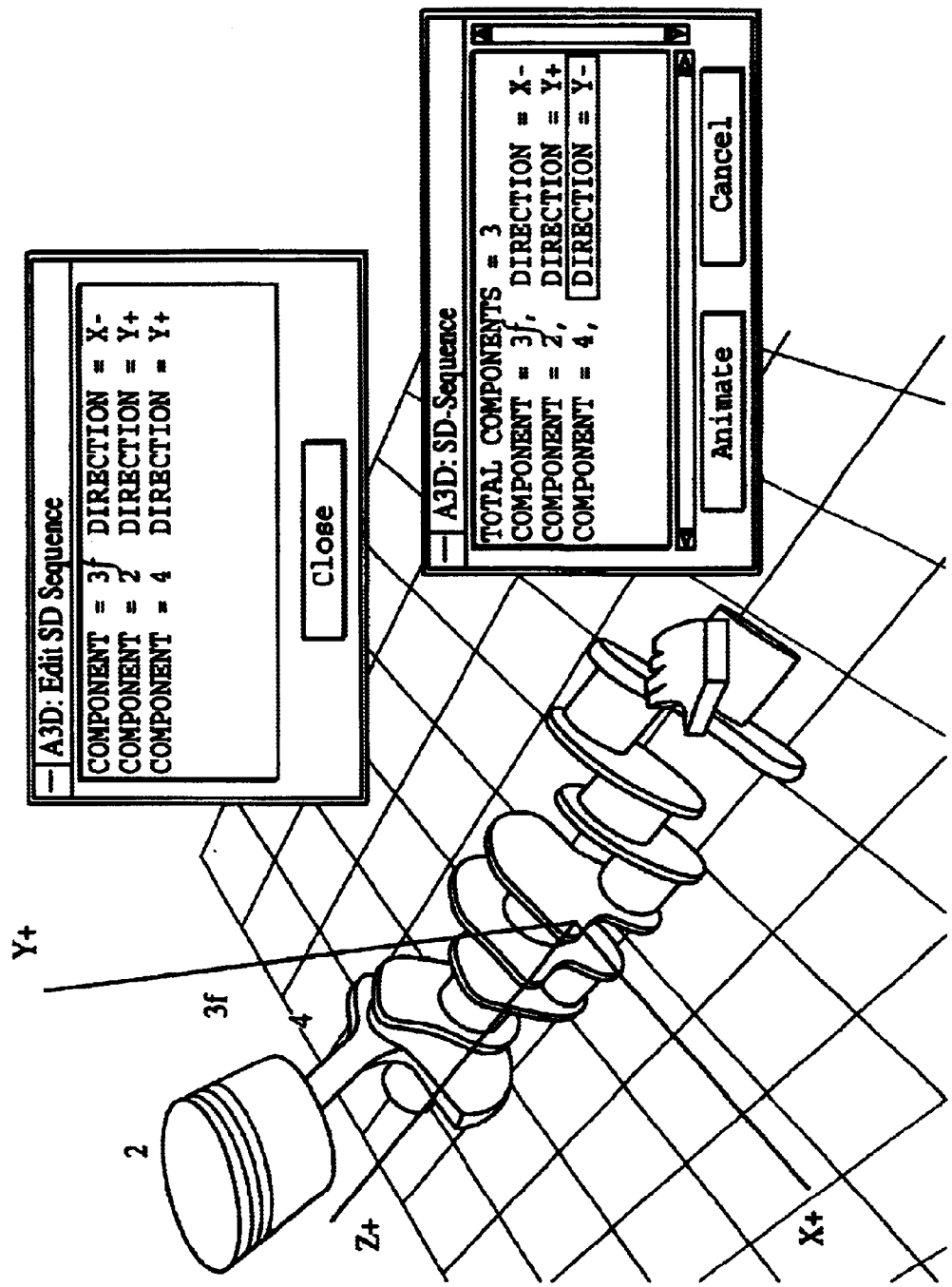
FIG. 19b is another view of an exemplary A3D display obtained from a computer monitor illustrating disassembly sequence validation after editing a disassembly sequence.

The A3D system allows the user to edit an automatically generated S and validate the edited S by computing the accessibility of the components accounting for the geometric constraints. Sequence editing and validation allows the user to modify the sequence for a particular application due to extraneous constraints. For example, FIG. 19b shows the result of a sequence editing procedure performed on a crankshaft assembly. Component 4 is edited to disassemble along direction Y-. However, since Y- for component 4 results in a collision, the system reports this error in a feedback text box in A3D. ps A3D System: Visualization and Animation It should be understood that throughout the accompanying drawings, the A3D system did not simply provide static and separate views of the assembled and disassembled CAD models. Rather, it allowed the user to obtain an animated view of the assembled and disassembled models, a feature which is regarded to be particularly valuable. Assembly/disassembly is generally hard for a designer to visualize unless very few assembly components are involved, and it was difficult to analyze prior to the development of the methods described in this paper. Therefore, since there have previously been few tools by which engineers could analyze and visualize assembly and disassembly, assembly/disassembly tended to be a subject of lesser attention; it would often be considered by the application of experience and intuition to the assembly at hand, rather than by a formal analysis. Since the A3D system allows rapid and full visualization and analysis of assembly and disassembly, assembly/disassembly can now be fully integrated and considered in engineering analyses. With respect to the ability to visualize and animate assembly/disassembly processes, it is believed that repeated exposure and use to A3D can effectively accelerate a designer's education and experience level because the ability to experience assembly and disassembly rapidly and virtually, rather than in slow and expensive real-world settings, allows a designer to gain greater experience and intuition regarding assembly/disassembly at a faster rate.

Applications of A3D

Figure 23:
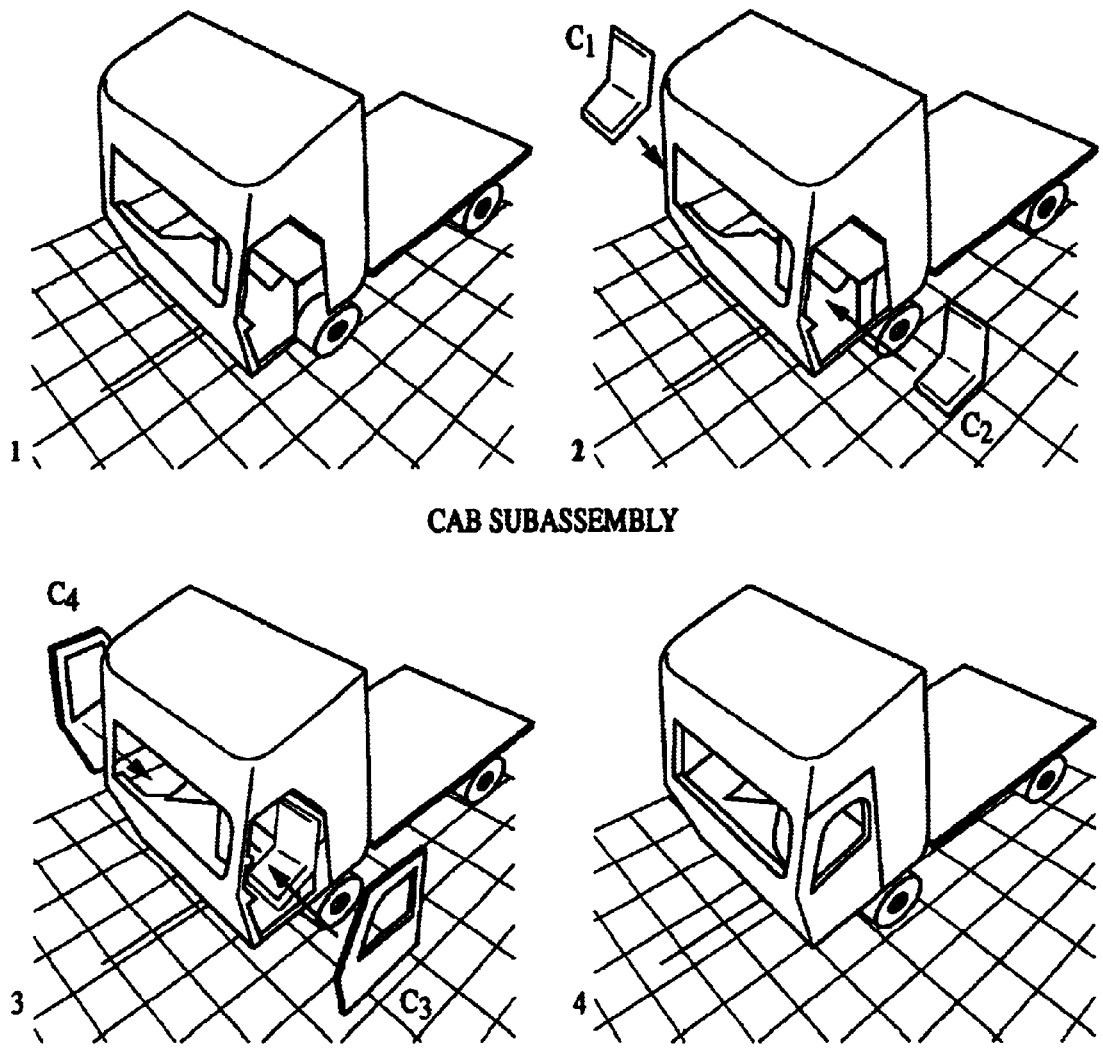
FIG. 23 is another view of an exemplary A3D display obtained from a computer monitor illustrating the assembly of a vehicle cab.

Applications of the A3D system (and more generally the invention) for design and manufacturing include:

Assembly/Disassembly: Evaluation of an assembly in A3D provides the user with information regarding the feasibility of assembling and disassembling the components, the accessibility of components, and the sequence and paths to assemble/disassemble the components in an assembly. As previously noted, a selective (or complete) disassembly sequence can be reversed and used for assembling components. For example, FIG. 23 shows an examplary A3D result for a cab subassembly illustrating the selective assembly of the cab seats followed by the cab doors, where the cab seats have to be assembled before the cab doors. In this case, OS=[$C_1$, $C_2$, $C_3$, $C_4$] with $n_s=4$ and $R_s=2$.

Maintenance: A3D allows determination of the assembly/disassembly sequence for product maintenance. The selective disassembly evaluation provides the user with information regarding the feasibility of disassembling the components for maintenance, wherein it is generally desirable to access or disassemble a component with minimum disassembly time or minimum removals or cost. Formulating the selective disassembly problem with minimum simultaneous removals often achieves the same desired result of minimum disassembly time.

The assembly/disassembly analysis for maintenance may be done after a product has been manufactured and placed in use; for example, if a component of an aircraft fails, it may be desirable to ascertain the easiest disassembly path to reach and repair the component, and then reassemble the aircraft, to get it back in service as soon as possible. Alternatively, it may be done during the design process, where the designer may wish to test design changes to facilitate ease-of-assembly/disassembly for later maintenance after the product is manufactured.

Figure 20:
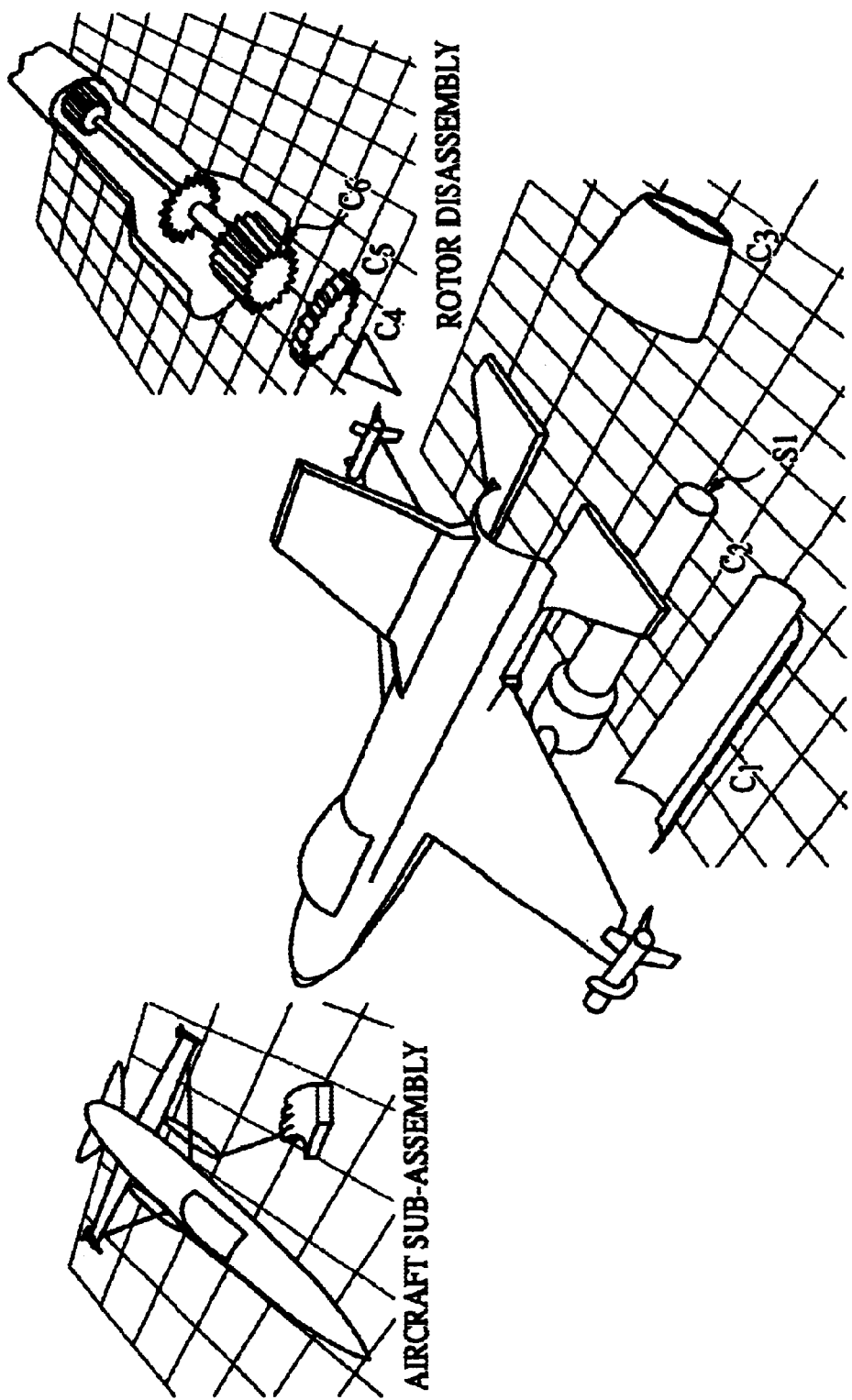
FIG. 20 is another view of an exemplary A3D display obtained from a computer monitor illustrating the disassembly of an aircraft engine for replacement or maintenance.
Figure 21:
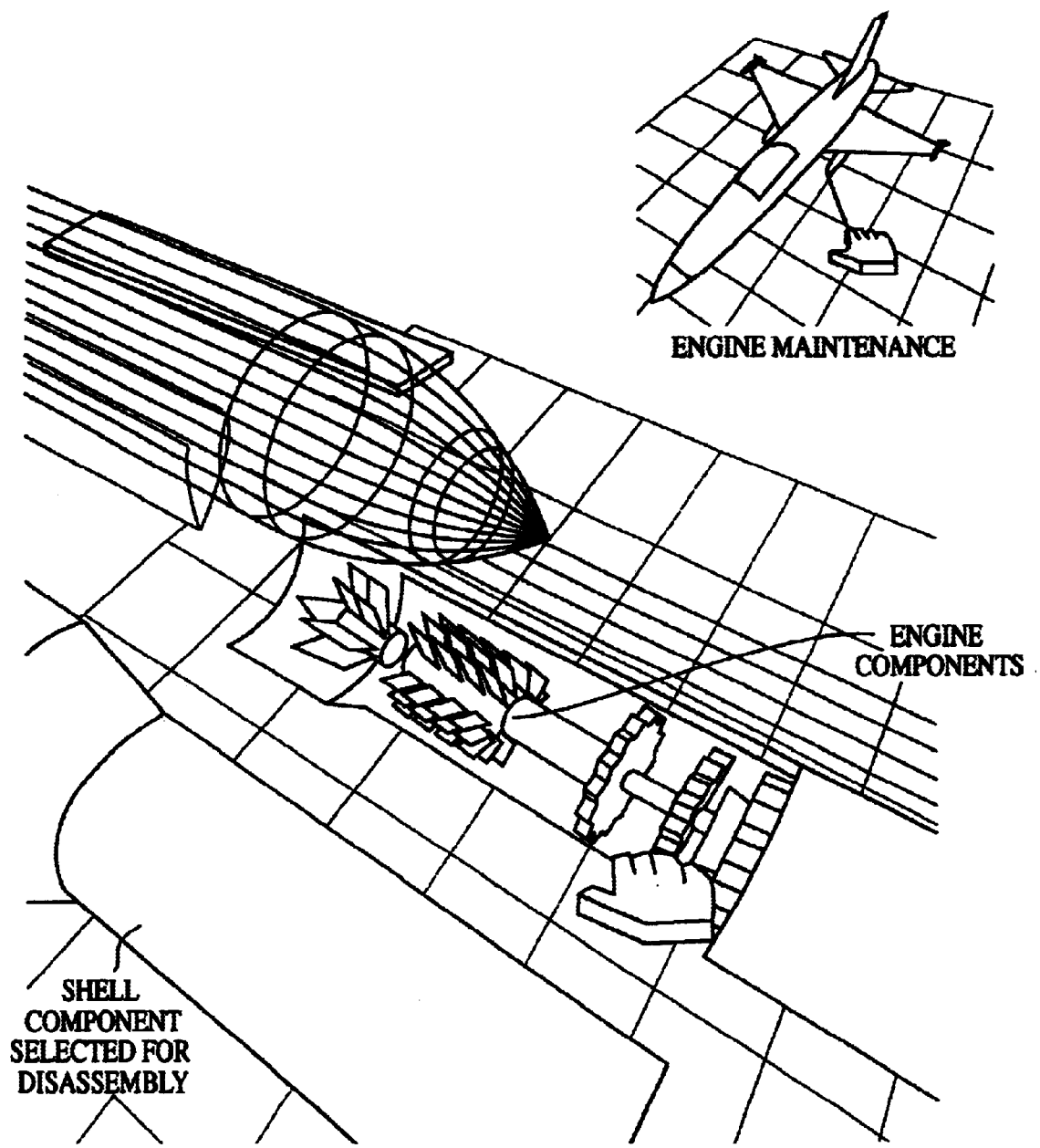
FIG. 21 is another view of an exemplary A3D display obtained from a computer monitor illustrating the selective disassembly of one of the outer shells of the aircraft engine of FIG. 20.

As an example of the application of A3D to maintenance, FIG. 20 illustrates the disassembly of an aircraft engine for replacement or maintenance. The aircraft engine (S1) is disassembled as a single unit from the aircraft subassembly $OS_1=[C_1, C_2, C_3, S1]$, with $n_s=4$ and $R_s=3$, followed by the disassembly of the rotor unit ($C_6$) from S1, where $OS_2=[C_4, C_5, C_6]$, with $n_s=3$ and $R_s=3$. Another example is provided in FIG. 21, which shows the selective disassembly of one of the outer shells of the engine generated by an automated selective disassembly method.

Figure 22:
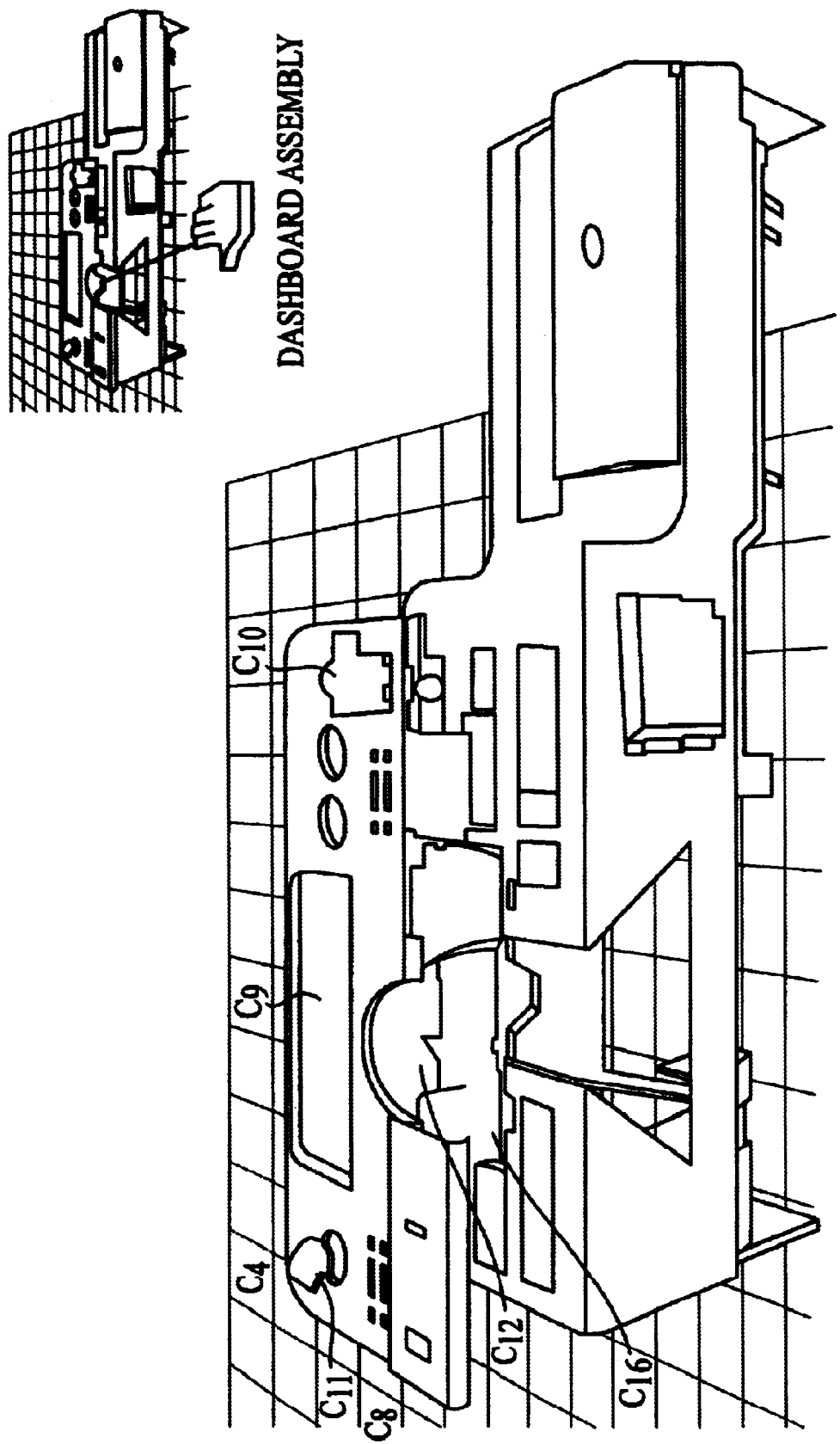
FIG. 22 is another view of an exemplary A3D display obtained from a computer monitor illustrating the disassembly of an instrument panel from a vehicle dashboard for recycling or reuse.

Recycling/Reuse: A3D allows determination of minimal component removal disassembly sequences for separating components of different materials. Minimal component removal generally results in maximizing recycling profits, which provides greater incentive for companies to recycle a product. In addition, the selective disassembly analysis may facilitate the user's ability to evaluate the disassembly cost if and when the product is disassembled for recycling/reuse. An examplary result is shown in FIG. 22 for selective disassembly of an instrument panel ($C_{16}$) from a dashboard assembly for recycling/reuse, wherein $OS=[C_4, C_{10}, C_{11}, C_8, C_9, C_{12}, C_{16}]$, with $n_s=7$ and $R_s=5$.

It is believed that while A3D, and more generally the invention, will find particular use in product design and manufacturing applications, it will also find use in assembly/disassembly analysis of structures which are not typically thought of as "assemblies" insofar as they do not exclusively involve collections of electromechanical components. As one example, the invention may be useful in determining how to best reach and repair a component, pipe, conduit, etc. which is buried in the ground or in a structure, and wherein the most evident paths to the item are obscured by other components, pipes, or other items which are best left undisturbed. As another example, the invention may assist in determining how to best reach and operate on an organ within a human or animal body.

It should be understood that preferred versions of the invention have been described above in order to illustrate how to make and use the invention. The invention is not intended to be limited to these versions, but rather is intended to be limited only by the claims set out below. Thus, the invention encompasses all different versions that fall literally or equivalently within the scope of these claims.

References

1. Agarwal, P. K., Berg, M., Halperin, D., and Sharir, M., 1996, "Efficient generation of k-directional assembly sequences," Proceedings of the *ACM-SIAM Symposium on Discrete Algorithms*, pages 122–131.
2. Ames, A. L., Calton, T. L., Jones, R. E., Kauftnan, S. G., Laguna, C. A., and Wilson, R. H., 1995, "Lessons learned from a second generation assembly planning system," Proceedings of the *IEEE Int. Symposium on Assembly and Task Planning*, pages 41–47.
3. Arkin, E. M., Connelly, R., and Mitchell, J. S. B., 1989, "On Monotone paths among obstacles, with Applications to Planning Assemblies," Proceedings of the *ACM Symposium on Computational Geometry*, pages 334–343.
4. Ashai, Z., 1995, "Shape based disassembly analysis of virtual prototypes," M. S. Thesis, Department of Mechanical Engineering, University of Wisconsin-Madison.
5. Baldwin, D. F., Abel, T. E., Lui, M. C. M., De-Fazio, T. L., and Whitney, D. E., 1991, "An Integrated computer aid for generating and evaluating assembly sequences for mechanical products," *IEEE Trans. On Robotics and Automation*, Vol. 7, no. 1, pp. 78–94.
6. Beasley, D., and Martin, R. R., 1993, "Disassembly sequences for objects built from unit cubes," *Journal of Computer Aided Design*, Vol. 25, no. 12, pp. 751–761.
8. De-Fazio, T. L., and Whitney, D. E., 1987, "Simplified generation of all mechanical assembly sequences," *IEEE Trans. On Robotics and Automation*, Vol. 3, No.6, pp. 640–658.
9. Halperin, D., Latombe, J. C., and Wilson, R. H., 1998, "A General framework for assembly planning-the motion space approach," *Proceedings of the ACM Computational Geometry*, pages 9–15.
10. Henrioud, J. M., and Boudjault, A., 1991, "LEGA: A Computer-aided generator of assembly plans," In L. S. Homem-de-Mello and S. Lee, editors, *Computer-Aided Mechanical Assembly Planning*, pages 191–215. Kluwer.
11. Homem de Mello, L. S., and Sanderson, A. C., 1991, "A correct and complete algorithm for the generation of mechanical assembly sequences," *IEEE Trans. On Robotics and Automation*, Vol. 7, no. 2, pp. 228–240.
12. Huang, J. F., and Lee, C. S. G., 1991, "A Framework of knowledge-based assembly planning," Proceedings of the *Int. Conference on Robotics and Automation*, pages 599–604.
13. Jones, R. E., Wilson, R. H., and Calton, T. L., 1997, "Constraint based interactive assembly planning," Proceedings of the *Int. Conference on Robotics and Automation*, pages 913–920.
14. Kaufmann, S. G., Wilson, R. H., Jones, R. E., Calton, T. L., and Ames, A. L., 1996, "The Archimedes 2 mechanical assembly planning system," Proceedings of the *Int. Conference on Robotics and Automation*, April 22–28, Minneapolis, pages 3361–3368.
15. Ko, H., and Lee, K., 1987, "Automatic assembling procedure generation from mating conditions," *Journal of Computer Aided Design*, Vol. 19, No. 1, pp. 3–10.
16. Latombe, J. C., Wilson, R. H., and Cazals, F., 1997, "Assembly sequencing with toleranced parts," *Journal of Computer Aided Design*, Vol. 29, no. 2, pp. 159–174.
17. Lee, S., and Shin, Y. G., 1990, "Assembly planning based on geometric reasoning," *Computation and Graphics*, Vol. 14, No. 2, pp. 237–250.
18. Romney, B., Godard, C., Goldwasser, M., and Ramkumar, G., 1995, "An efficient system for geometric assembly sequence generation and evaluation," Proceedings of the *ASME Design Engineering Technical Conference*, July 23–27, Hawaii, pages 699–712.
19. Schweikard, A., and Wilson, R. H., 1995, "Assembly sequences for polyhedra," *Algorithmica*, Vol. 30, No. 6, pp. 539–552.
20. Shyamsundar, N., and Gadh, R., 1997, "Geometric abstractions to support disassembly," *IIE Transactions on Design and Manufacturing*, Accepted September. 1997.
21. Srinivasan, H., and Gadh, R., 1997, "Efficient disassembly of multiple components in an assembly using wave propagation," Accepted for publication in the *ASME Journal of Mechanical Design*, to be published June 2000.
22. Srinivasan, H., and Gadh, R., 1998, "A Geometric algorithm for single selective disassembly using the wave propagation abstraction," *Journal of Computer Aided Design*, Vol. 30, no. 8, pp. 603–613.
23. Srinivasan, H., Figueroa, R., and Gadh, R., 1999, "Selective disassembly for virtual prototyping as applied to de-manufacturing," *Journal of Robotics and Computer Integrated Manufacturing*, Vol. 15, no.3, pp. 231–245.
24. Srinivasan, H. and Gadh, R., 1999, "Selective Disassembly: Representation and Comparative Analysis of Wave Propagation Abstractions in Sequence Planning," Accepted for publication in the proceedings of the IEEE *International Symposium on Assembly and Task Planning*, July 21–24, Porto, Portugal, Paper No. ATP/USA/17.
25. Swaminathan, A., and Barber, K. S., 1996, "An Experience-based assembly sequence planner for mechanical assemblies," *IEEE Trans. Of Robotics and Automation*, Vol. 12, No. 2, pp. 252–267.

What is claimed is:

1. A method for at least partially determining a component assembly/disassembly sequence for one or more target components within a multi-component assembly, the method comprising:
   a. determining n spatial boundary sets of components, the spatial boundary sets being ordered from an outermost spatial boundary set 1 to an innermost spatial boundary set n, wherein
      (1) 1 is the set of components within the assembly which are removable from the assembly without collision against one or more other components,
      (2) $x(1<x\leq n)$ is the set of components which are removable from the assembly without collision against one or more other components after any prior spatial boundary sets are removed from the assembly;
   b. for each target component, determining n target sets $\tau$ of components, the target sets being ordered from an innermost target set $\tau 1$ to an outermost target set $\tau n$, wherein $\tau x$ ($1 \leq x \leq n$) is the set of components such that for every component Cj in $\tau x$, there will be at least one component Ci in $\tau x-1$ such that Ci is removable from the assembly without collision after Cj is removed, provided the components within all $\tau y$ ($y \geq x+1$) are absent;
   c. determining the components at the intersections between the spatial boundary sets and the target sets $\tau$;
   whereby each intersection between
      (i) the target sets $\tau$ for target components m, and
      (ii) one of the spatial boundary sets b, defines a component requiring removal for removal of the target components m from the assembly.

2. The method of claim 1 further comprising the step of determining the disassembly sequences between the components at the intersections and the components at the outermost spatial boundary set 1.

3. The method of claim 2 wherein the step of determining the disassembly sequences between the components at the intersections and the components at the outermost spatial boundary set includes:
   a. defining the components at the intersections as inner components,
   b. for each inner component, identifying all outer components, such outer components being:
      (1) in the spatial boundary set prior to the spatial boundary set of the inner component;
      (2) such that the inner component is removable only when all components in
         (a) the spatial boundary set of the outer component, and
         (b) spatial boundary sets prior to that of the outer component, are absent from the assembly;
   c. recursively continuing the method with step b, wherein:
      (1) identified outer components are redefined as inner components, and
      (2) inner components are stored in priority order.

4. The method of claim 1 further comprising the step of determining the disassembly sequences between the target component and the components at the intersections, thereby defining the disassembly sequences between the target component and the components at the outermost spatial boundary sets.

5. The method of claim 4 wherein the step of determining the disassembly sequences between the target component and the components at the intersections includes:
   a. defining the target component as an inner component,
   b. for each inner component, identifying all outer components, such outer components being:
      (1) in the spatial boundary set prior to the spatial boundary set of the inner component;
      (2) such that the inner component is removable only when all components in
         (a) the spatial boundary set of the outer component, and
         (b) spatial boundary sets prior to that of the outer component, are absent from the assembly;
   c. recursively continuing the method with step b, wherein:
      (1) identified outer components are redefined as inner components, and
      (2) inner components are stored in priority order.

6. The method of claim 4 wherein the step of determining the disassembly sequences between the target component and the components at the intersections includes:
   a. defining the intersection components as outer components;
   b. for each outer component:
      (1) storing the identity of the outer component;
      (2) for the one or more components which
         (a) are in a spatial boundary set later than that of the outer component, and
         (b) which are removable only when:
            i) the outer component, and
            ii) all components in spatial boundary sets prior to that of the outer component,
         are absent from the assembly,
      recharacterizing each of these one or more components as outer components; and
      (3) recursively continuing the method with step b(1), with outer components being stored in priority order.

7. The method of claim 4 further comprising the step of identifying at least one optimal disassembly sequence, the optimal disassembly sequence being the disassembly sequence with minimum components.

8. A method for at least partially determining a component assembly/disassembly sequence for at least one target component within a multi-component assembly, the method comprising:
   a. determining n spatial boundary sets of components, the spatial boundary sets being ordered from an outermost spatial boundary set 1 to an innermost spatial boundary set n, wherein
      (1) 1 is the set of components within the assembly which are removable from the assembly without collision against one or more other components,
      (2) $x(1<x\leq n)$ is the set of components which are removable from the assembly without collision against one or more other components after any prior spatial boundary sets y (y<x) are removed from the assembly;

b. determining the spatial removal influence on each component in x by all subsets of one or more components within all spatial boundary sets prior to the spatial boundary set of which the component is a member, the spatial removal influence on the component by each subset being positive if the component is removable only when the subset is absent from the assembly, thereby defining the removability of each component with respect to the other components in the assembly.

* * * * *